US008496166B2

(12) United States Patent
Burns et al.

(10) Patent No.: US 8,496,166 B2
(45) Date of Patent: Jul. 30, 2013

(54) SYSTEM FOR ASSOCIATING RFID TAG WITH UPC CODE, AND VALIDATING ASSOCIATIVE ENCODING OF SAME

(75) Inventors: Gary P. Burns, Rockford, MI (US); Peter Phaneuf, Grand Rapids, MI (US); Michael Isabell, Grand Rapids, MI (US)

(73) Assignee: eAgile Inc., Grand Rapids, MI (US)

( * ) Notice: Subject to any disclaimer, the term of this patent is extended or adjusted under 35 U.S.C. 154(b) by 0 days.

(21) Appl. No.: 13/593,399

(22) Filed: Aug. 23, 2012

(65) Prior Publication Data

US 2013/0048711 A1 Feb. 28, 2013

Related U.S. Application Data

(60) Provisional application No. 61/526,473, filed on Aug. 23, 2011, provisional application No. 61/562,618, filed on Nov. 22, 2011.

(51) Int. Cl.
*G06F 17/00* (2006.01)
*G06K 19/06* (2006.01)

(52) U.S. Cl.
USPC .......................................... 235/375; 235/492

(58) Field of Classification Search
USPC ............................ 235/375, 492, 380, 486, 487
See application file for complete search history.

(56) References Cited

U.S. PATENT DOCUMENTS

| | | | | |
|---|---|---|---|---|
| 7,380,714 B2 * | 6/2008 | Jusas et al. | ...................... | 235/451 |
| 7,473,097 B2 * | 1/2009 | Raby et al. | ........................ | 433/24 |
| 7,857,221 B2 * | 12/2010 | Kuhno et al. | .............. | 235/462.1 |
| 8,072,333 B2 * | 12/2011 | Ferguson et al. | .......... | 340/572.7 |
| 2005/0139667 A1 * | 6/2005 | Barrus et al. | .................. | 235/432 |
| 2005/0230478 A1 | 10/2005 | Chapman et al. | | |
| 2007/0283556 A1 | 12/2007 | Wehr | | |
| 2011/0133899 A1 | 6/2011 | Shachar | | |
| 2011/0303752 A1 * | 12/2011 | Alleshouse | .................... | 235/492 |

FOREIGN PATENT DOCUMENTS

| | | |
|---|---|---|
| KR | 10-2006-0102217 A | 9/2006 |
| KR | 10-2011-0047516 A | 5/2011 |

OTHER PUBLICATIONS

Imation; DataGuard rf™ Volser Labels with RFID; 1 page; Copyright 2000-2011 Imation Corp.; accessed from the Internet Jun. 1, 2011.
Zebra Technologies; Zebra® R110Xi4™ RFID Printer/Encoder; Dec. 2010; 4 pages; USA.
Weber Marking Systems, Inc.; Weber's Educational Resources; Meeting the EPC RFID Mandates: Where to Begin; 2011; 4 pages; accessed from the Internet Mar. 17, 2011.
SCDigest Editorial Staff; Supply Chain Digest; Printing RFID Labels with a Laser Printer; Digest; Sep. 1, 2009; 2 pages; www.scdigest.com.

* cited by examiner

*Primary Examiner* — Thien M Le
(74) *Attorney, Agent, or Firm* — McGarry Bair PC

(57) ABSTRACT

An assemblage for preparing and validating a smart label including an RFID inlay and selected symbology includes a workstation with a symbology printer and an RFID printer, and a validation station. The validation station includes a digital control device for storing software and housing digital hardware, a symbology reader, an RFID transceiver for reading data encoded on an RFID tag, an encoding and validation chamber, and a computer. The workstation is configured to occupy a minimal area for optimizing the preparation and validation of an associated RFID tag and symbology, and the associated RFID tag and symbology can be contemporaneously printed, encoded with data specific to an item to which the RFID tag and symbology are to be affixed, and validated individually and with respect to one another.

10 Claims, 18 Drawing Sheets

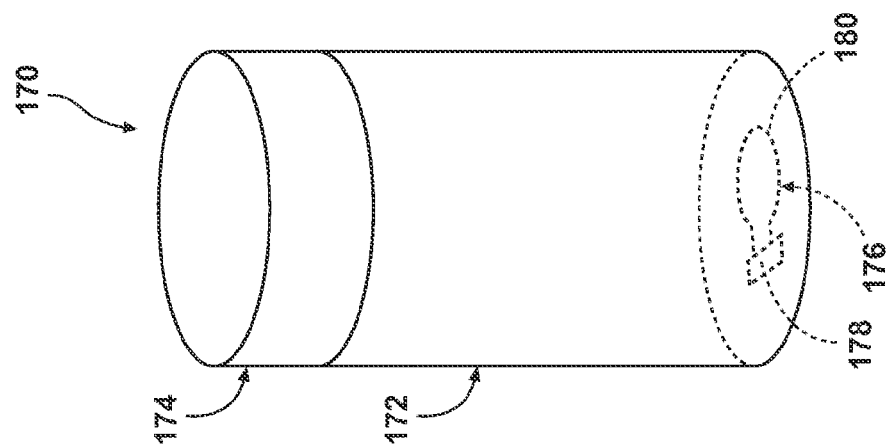
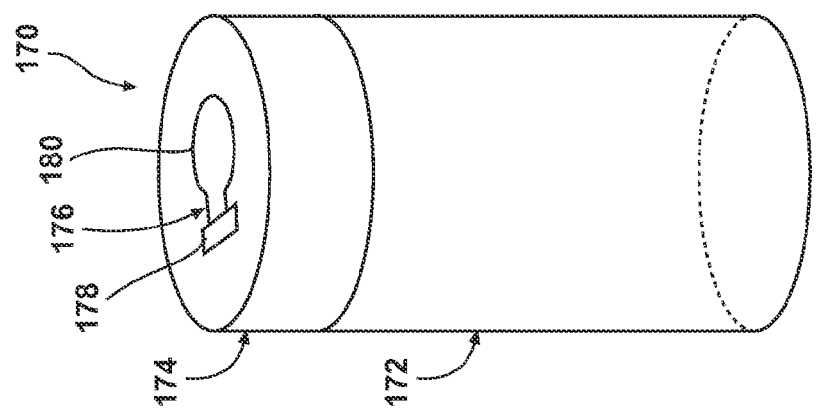
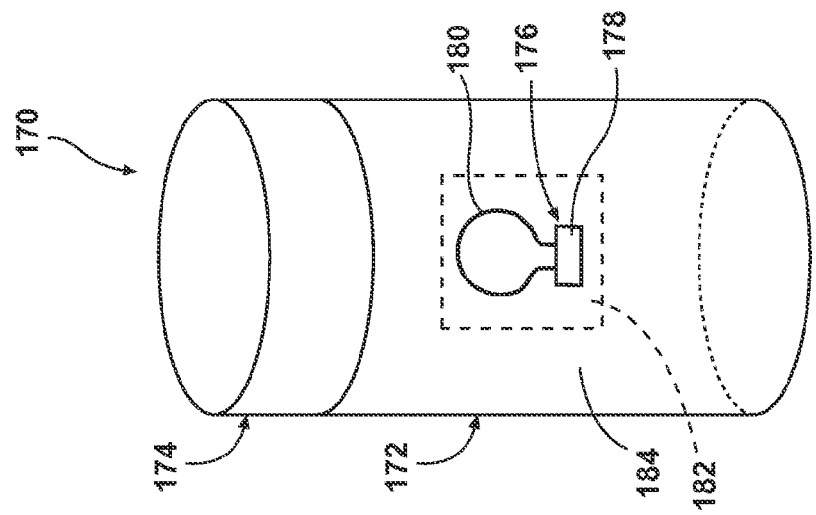

SYSTEM FOR ASSOCIATING RFID TAG WITH UPC CODE, AND VALIDATING ASSOCIATIVE ENCODING OF SAME

CROSS-REFERENCE TO RELATED APPLICATIONS

This application claims the benefit of U.S. Provisional Applications Ser. Nos. 61/526,473 and 61/562,618, filed Aug. 23, 2011, and Nov. 22, 2011, respectively, each of which is incorporated herein by reference in its entirety.

BACKGROUND OF THE INVENTION

1. Field of the Invention

In one aspect, the invention relates to an assembly for contemporaneously preparing, encoding, and validating the encoding of symbologies and associated RFID transponders. In another aspect, the invention relates to a process for contemporaneously preparing, encoding, and validating the encoding of symbologies and associated RFID transponders. In yet another aspect, the invention relates to a system or assemblage for maintaining inventory control utilizing contemporaneously prepared, encoded, and validated symbologies and associated RFID transponders. In another aspect, the invention relates to a system or assemblage for facilitating a chain-of-custody protocol utilizing contemporaneously prepared, encoded, and validated symbologies and associated RFID transponders. In another aspect, the invention relates to a system or assemblage for simultaneously identifying and encoding a plurality of RFID tags, each tag including an alpha-numeric character(s), a 2-D barcode, color coding, and an RFID transponder having a UTID.

2. Description of the Related Art

A "symbology" may be defined as a predefined configuration of one or more symbols, icons, logos, and the like, which can "contain" or represent data that may be read and decoded by a scanner and/or a decoding protocol. Examples of a symbology include a system of linear barcodes, a 2-dimensional or "2-D" code, which may take one of several forms, such as an Aztec code, a DataMatrix code, a Maxicode, a QR code, or forms similar to linear barcodes, alpha-numeric characters, color bars, ID photos, fingerprints, and retinal images.

Other technologies, such as a magnetic strip or a radio-frequency identification (RFID) tag, may also store data for later retrieval. Each symbology and/or technology may be associated with a different encoding technique, different reading technique, different technical specification or characteristic, different industry standard, and the like. Preparing, encoding, and validating several different, but associated, symbologies and/or technologies may involve multiple encoding devices, multiple scanning devices, and validation devices that are capable of interpreting and comparing data from the different technologies.

RFID inlays may be prepared, encoded, and incorporated with products having a generally undifferentiated appearance. In addition to an RFID transponder, an item may be uniquely identified by a magnetic strip, embossed alphanumerics, a barcode, or a combination thereof. For example, a credit card may include embossed alphanumeric characters, a magnetic strip, and an RFID transponder. The redundant data storage components may be monitored by one or more of a visual scanning instrument, a magnetic reader, a radio-frequency transceiver, and the like.

Each data storage component, e.g. barcode, color bar, RFID transponder, must be accurately encoded with selected data, and the accuracy must be validated. The data associated with a data storage component must also be verified against the data associated with every other data storage component. Preparing, encoding, and validating multiple technologies and symbologies, particularly in a coordinated manner, raises technological and operational challenges. There is a need for a system that enables end users to dynamically select data input for diverse storage components and to validate such data input.

BRIEF DESCRIPTION OF THE INVENTION

An assemblage for preparing and validating a smart label including an RFID inlay and selected symbology includes a workstation with a symbology printer and an RFID printer, and a validation station. The validation station includes a digital control device for storing software and housing digital hardware, a symbology reader, an RFID transceiver for reading data encoded on an RFID tag, an encoding and validation chamber, and a computer. The workstation is configured to occupy a minimal area for optimizing the preparation and validation of an associated RFID tag and symbology, and the associated RFID tag and symbology can be contemporaneously printed, encoded with data specific to an item to which the RFID tag and symbology are to be affixed, and validated individually and with respect to one another.

BRIEF DESCRIPTION OF THE DRAWINGS

In the drawings

FIGS. 10A-C are perspective views of exemplary analytic containers as illustrated in FIG. 9.

DESCRIPTION OF EMBODIMENTS OF THE INVENTION

Figure 1:
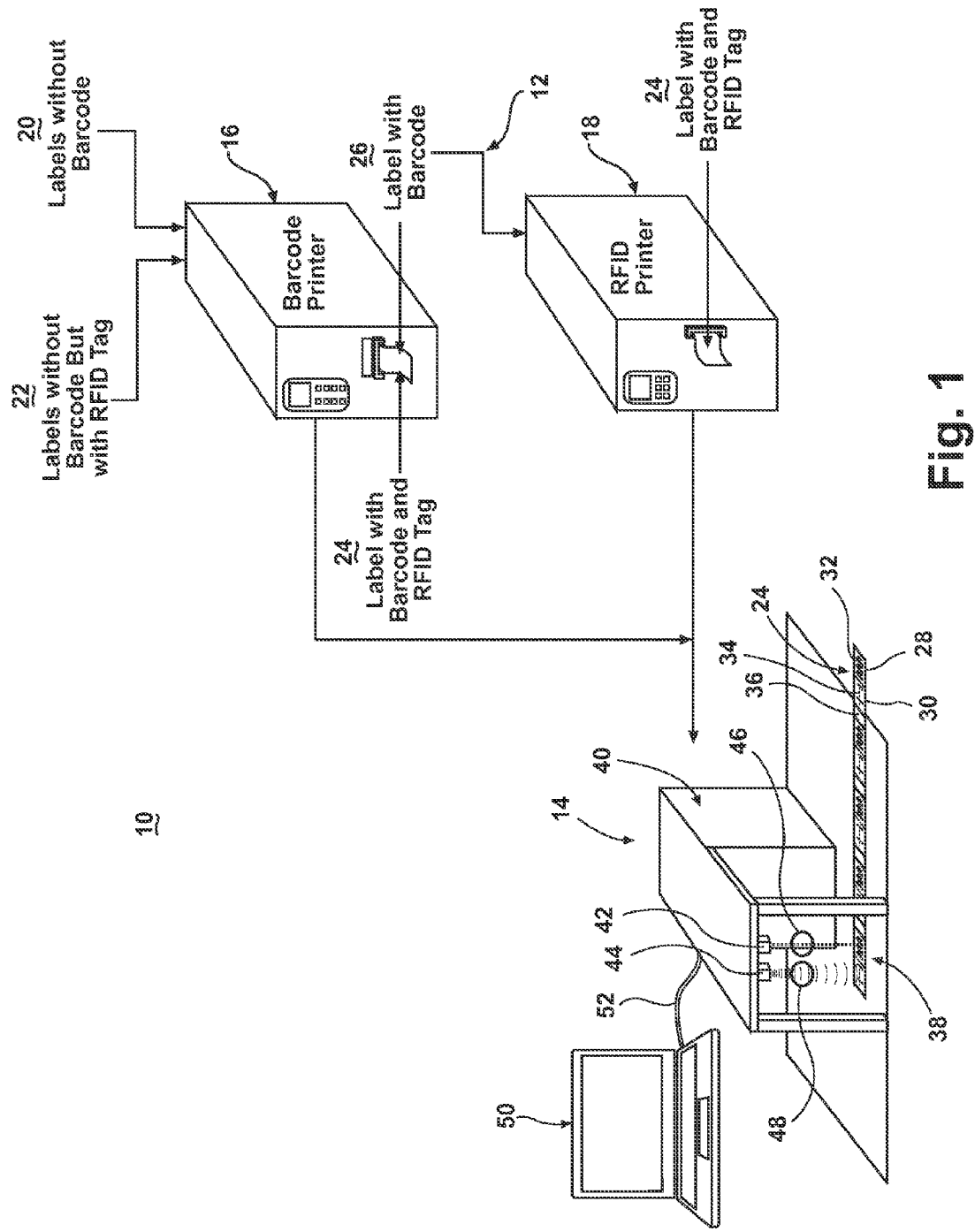
FIG. 1 is a partially schematic perspective view of a first exemplary embodiment of a workstation for preparing and validating a combination barcode and RFID transponder.

The figures herein illustrate exemplary embodiments of a compact, fully integrated system, also referred to herein as an "assemblage," for contemporaneously encoding, i.e. programming, and validating a radio-frequency identification (RFID) transponder and one or more associated symbologies, such as a UPC code or barcode, a matrix barcode, also known as a 2-D code, alpha-numeric characters, a color bar, an ID photo, a fingerprint, a retinal image, and the like. An exemplary method of preparing, encoding, and validating the encoding of, an RFID inlay is described hereinafter. The system addresses the need of end-users to dynamically select a data input for a symbology element and to verify the synchronization of the symbology element and an RFID transponder. The method described herein enables an end-user to dynamically generate and validate symbology data and RFID data.

As used herein, "RFID tag" refers to a microchip, also known as an integrated circuit or "IC," attached to an antenna and packaged so that it may be affixed to an object. An RFID tag may also be termed an "RFID transponder" or "transponder." The integrated circuit may store and process information, modulate and demodulate a radio-frequency (RF) signal, collect DC power from an incident reader signal, and perform other specialized functions. The antenna may receive and transmit an RF signal.

As used herein, "RFID inlay" or "inlay" refers to an RFID microchip attached to an antenna and mounted on a label substrate. An inlay may essentially comprise an unfinished RFID label. An inlay may usually be converted into a smart label, i.e. a barcode label that contains an RFID transponder. A smart label may have a barcode or other symbology printed on it.

As used herein, "print" or "printing" refers to any methodology for producing an image on a substrate, including application of inked types, plates, and/or blocks, to a substrate using a direct or offset process, engraving, stamping, embossing, lithography, digital printing, e.g. laser, inkjet, and the like, photography, screen printing, and the like. "Print" and "printing" also refer to the implementation of one or more of such methodologies to produce an image on a substrate.

As used herein, "symbology" or "symbologies" include UPC codes or barcodes, matrix barcodes, alpha-numeric characters, color bars, ID photos, fingerprints, retinal images, and the like, which may be "read" by an optical scanner.

The term "transmitter" may refer to a "reader," an "antenna," or a "reader with antenna." A "reader" is an industry term for a device that reads and encodes RFID tags/inlays through an antenna.

As used herein, "validation station" refers to an apparatus and process for validating data encoded in an RFID transponder with an associated symbology, such as a barcode, in a highly efficient and accurate manner. "Validation station" may include control devices, printers, readers, communicators, computer software, enclosures, and the like, assembled in one or more combinations and configurations, as described hereinafter.

Referring to the figures, and particularly to FIG. 1, a first exemplary embodiment of an RFID encoding and validation system 10 is illustrated. The system 10 may associate symbologies (illustrated and described herein in the exemplary form of a barcode) with RFID transponders, and may include a printer assembly 12, which may optionally include a symbology printer 16 (for illustrative purposes referred to as a "barcode printer") and an RFID printer 18. Alternatively, the symbology printer may prepare a 2-D code, a color bar, and the like, and may also be adapted to prepare a magnetic strip. The printer assembly 12 may include suitable data assignment software for operation and communication purposes, such as software compatible with EPC global standards, enterprise-level software, and the like.

The system 10 also may include a validation station 14 for validating a selected symbology with an encoded RFID transponder, as hereinafter described. As the following description will make clear, the system 10 may include different combinations and configurations of printers and validation stations based upon different uses to which the system 10 may be put.

The printers 16, 18 may print a symbology, such as a barcode, and an RFID transponder on a substrate 36, such as label blanks, each of which may include both a barcode and an RFID transponder. A ribbon stock may include a carrier substrate 36 supporting a plurality of label blanks. The label blanks may be configured for individual labels having a barcode area 28 and an RFID area 30. If more than one symbology may be utilized, additional symbology areas may be defined on the label blanks.

The barcode area 28 may receive a barcode 32, and the RFID area 30 may receive an RFID transponder 34. The label stock 20 may be blank, without a barcode 32 or an RFID transponder 34. The barcode printer 16 may print the label stock 20 with successively different barcodes to produce labels 26 with a barcode 32 in each barcode area 28, but without an RFID transponder 34. Alternatively, the label stock 22 may include an unencoded RFID transponder 34 in the RFID area 30, but without a barcode. The barcode printer 16 may print the label stock 22 with successively different barcodes to produce labels 24 with a barcode 32 in each barcode area 28 and an RFID transponder 34 in each RFID area 30. The labels 24 may then proceed to the validation station 14 for encoding of the RFID transponder 34. Alternatively, the labels 26 may proceed to the RFID printer 18 for addition of the RFID transponder 34 to produce labels 24 with a barcode 32 in each barcode area 28 and an RFID transponder 34 in each RFID area 30. The labels 24 may then proceed to the validation station 14 for encoding and validation of the RFID inlay 31.

The validation station 14 may include an indexing table 38, a digital control device 40, a barcode reader 42, an RFID transceiver 44, and a laptop computer 50. The validation station 14 is illustrated in FIG. 1 as an apparatus separate from the printers 16, 18. The digital control device 40 and laptop computer 50 are illustrated as electrically coupled through a suitable cable 52. A wireless connection may also be utilized between the laptop computer 50 and the digital control device 40. Alternatively, the validation station 14 may incorporate a combination digital control device 40 and printer 16, 18, or a combination digital control device 40, printer 16, 18, and laptop computer 50.

Figure 2:
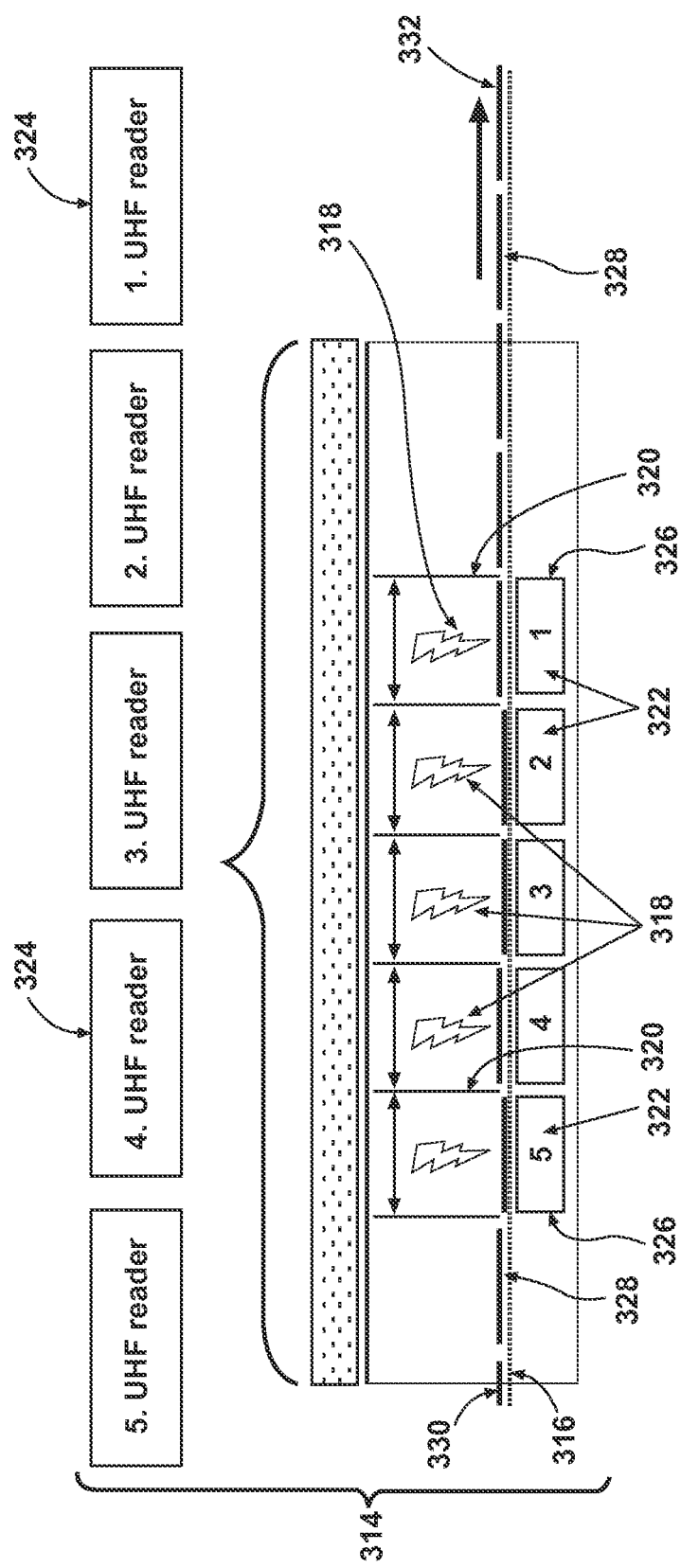
FIG. 2 is a schematic view of an exemplary embodiment of a workstation for contemporaneously preparing and validating a plurality of symbologies and/or technologies.

FIG. 2 illustrates an alternate matrix validation station 314 in schematic form. The matrix validation station 314 may implement an encoding and validating process that may be generally similar to the process implemented by the system 10. Thus, the matrix validation station 314 includes a ribbon transporter 316 for translating and indexing label stock 330. The matrix validation station 314 includes several encoding/validation chambers 318 in adjacent disposition. Vertically disposed shield plates 320 are interposed between adjoining chambers 318 in a configuration sufficient to isolate each chamber 318 from UHF signals generated in an adjacent chamber 318. The shield plates 320 may be horizontally adjustable to selectively increase or decrease the size of the chamber 318. The shield plates 320 may be fabricated of a material having suitable properties and configurations for the purposes for which they are employed.

A shielded enclosure 322 may be positioned beneath each chamber 318 to hold electromechanical encoding and validating elements, such as antennas, transmitters, micro-circuitry, and the like. The shielded enclosures 322 may be fabricated of a material or materials having suitable properties and configurations sufficient to isolate each chamber 318 and enclosure 322 from UHF signals generated in an adjacent chamber 318 or enclosure 322.

The label stock 330 may be delivered to the chambers 318 and indexed so that each chamber 318 and enclosure 322 may be associated with a selected label. The encoding and validating of each label may proceed generally as previously described herein. However, rather than processing a single label, a plurality of labels (illustrated in FIG. 2 as numbering 5) may be contemporaneously encoded and validated. The matrix validation station 314, and the encoding and validation process, may provide finished labels 322 for in-line high volume applications. The label stock 330 as illustrated in FIG. 2 may comprise ribbon-type stock having a narrow substrate 328 supporting a single line of labels. Alternatively, the label stock may comprise sheet stock, with labels supported upon a substrate in a matrix configuration. An array of encoding/validation chambers may be utilized rather than a line of chambers.

In a further alternative, sheet stock may be utilized with encoding/validation chambers configured to produce labels having a plurality of symbologies. A first line of chambers may be associated with encoding and validation of RFID transponders. A second line of chambers may be associated with encoding and validation of barcodes. A third line of chambers may be associated with encoding and validation of color bars. Lines of chambers may be oriented in a validation station depending upon the different symbologies needed for each label. A selected number of multi-symbology labels may be simultaneously encoded, validated, and locked.

The digital control device 40 may be configured to store software applications to perform various functions of the validation station 14, and house digital hardware (not shown) such as ROM, RAM, a digital integrated circuit (IC) (also referred to as a chip, a CPU, or a processor), and converters for converting signals from the barcode reader 42 and the wireless RFID transceiver 44 into a processor-usable format. A converter may also be included to convert data signals 48 from the control device 40 through the RFID transceiver 44 to the RFID transponder 34 to encode the RFID transponder. Both the digital control device 40 and the laptop computer 50 may be configured for reciprocal communication, and the computer 50 may provide functionality associated with the digital control device 40, either as a backup or as the primary device.

The printed label 24 may travel along an indexing table 38 so that the barcode 32 and the RFID transponder 34 are aligned relative to a barcode reader 42 and an RFID transceiver 44, respectively. The barcode reader 42 may scan the barcode 32, capture 42 the data therefrom, and communicate the data to the digital control device 40 and the laptop computer 50. The data from the barcode scan may be compared against data from a barcode database to verify the accuracy of the barcode. If the barcode may be validated, data from the barcode may be translated through a suitable software application stored in the digital control device 40 or laptop computer 50 into a format suitable for encoding the RFID transponder 34. The formatted data may then be encoded into the RFID transponder 34 through the RFID transceiver 44.

The validation station 14 illustrated in FIG. 1 is an exemplary schematic representation. Alternative apparatus and methods may be employed to read the barcode 32 and encode the RFID transponder 34. For example, the indexing table 38 may be configured for automated indexing of the printed label 24 and operably connected with the printer 16, 18 to provide a fully automated printing, indexing, and validating system. Such a configuration may accommodate a continuous supply of label stock, such as from a reel. Subsequent to validation, the continuous ribbon of labels 24 may be rewound on a take-up reel, or sent through a cutting station (not shown) for separation into individual labels. Alternatively, the continuous ribbon of printed labels 24, or individual labels 24, may be manually positioned on a table for encoding and validation.

A validation station (not shown) may be optionally configured for reading, encoding, and validating printed labels 24 applied previously to containers holding, for example, pharmaceuticals, test samples, and the like, or to empty containers. Such a validation station may be configured to accommodate a continuous supply of containers, or a single container.

The barcode reader 42 and the RFID transceiver 44 may read the barcode 32 and RFID transponder 34, respectively, and validate the proper association of the RFID transponder 34 with the barcode 32. Other functions may be performed, such as "locking" the RFID inlay 31 into a "read only" format to maintain proper association of the RFID transponder 34 with the barcode 32 during the life of the RFID inlay 31.

In the example of the label stock 22 without barcodes but with RFID transponders, the RFID transponders may be pre-encoded. The barcode printer 16 may be integrated with the validation station 14 so that the RFID transponder 34 may be read by the RFID transceiver 44. Data from the RFID transponder 34 may be translated and utilized to print an associated barcode 32 in the barcode area 28. Validation of the association of the RFID transponder 34 with the barcode 32 may then proceed as described above.

Figure 3:
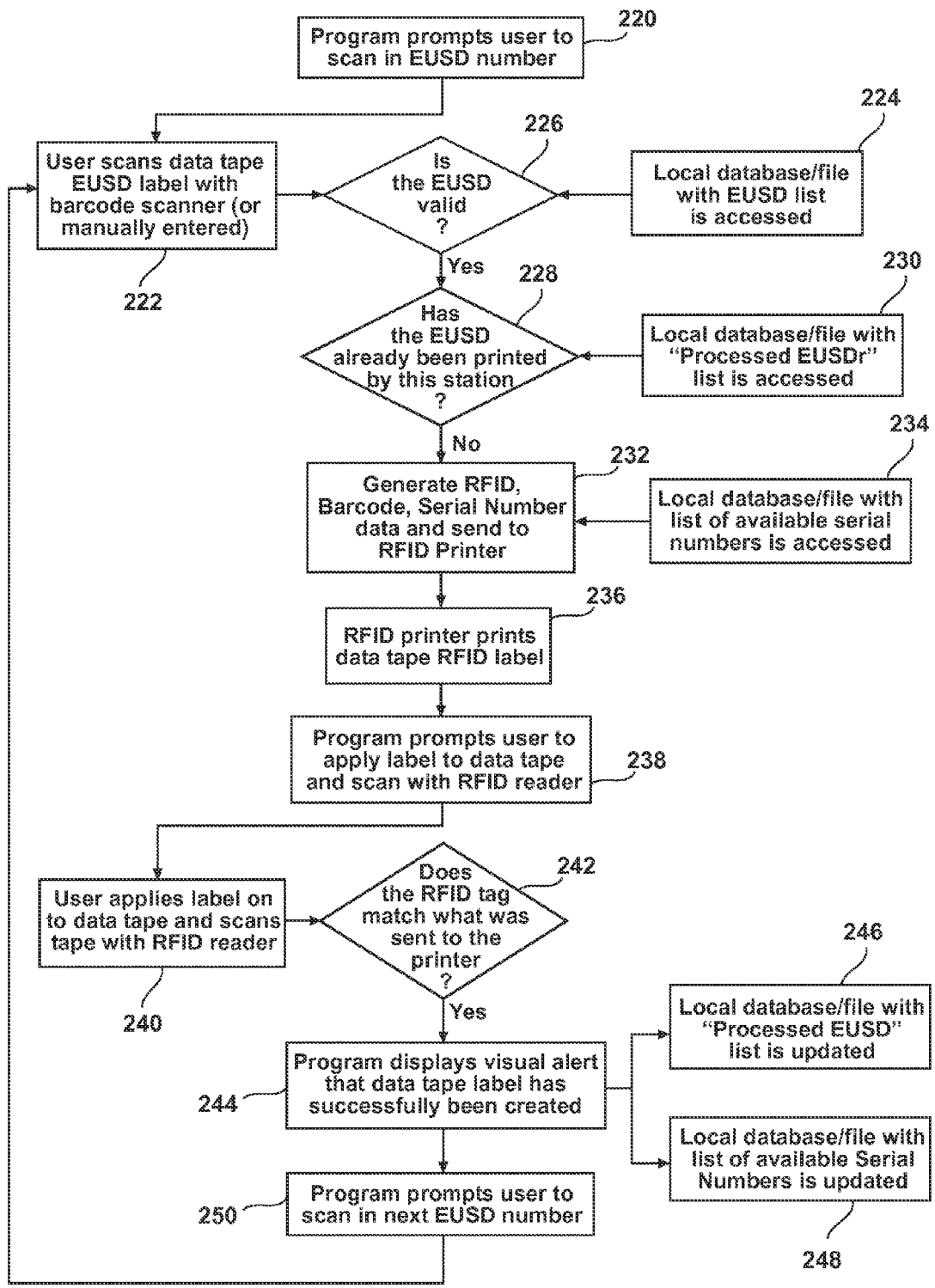
FIG. 3 is an exemplary flowchart of a method of preparing and validating a combination barcode and RFID transponder.

FIG. 3 is an exemplary flow chart for a validation process. It is based generally upon a manual validation process, i.e. a process in which movement of labels and sequencing of steps may be performed manually. FIG. 3 is not intended to limit the encoding and validation process in any way. Other validation processes may be employed based, for example, upon the number and type of symbologies collectively processed, the manner in which each type of symbology may be "read," the configuration of symbologies on a tag, and the like.

As used in FIG. 3, the term "EUSD" is an acronym for "end-user selected data" associated with a selected symbology, such as a 2-D code, a color bar, an ID photo, a magnetic strip, and the like, and stored in an RFID chip. The validation process is described hereinafter as relating to an RFID transponder and an exemplary barcode.

The validation process illustrated by the flow chart begins with a scanning prompt step 220 in which an operator may be prompted to scan in a EUSD. This may be followed by a barcode scanning step 222, which, as discussed above, involves reading the barcode 32 with the barcode reader 42. Alternatively, the barcode 32 may be manually entered. A first EUSD database may be stored in the digital control device 40, and may be accessed in a barcode data base access step 224. The validity of the EUSD read in the scanning step 222 may be checked against the EUSD database in a barcode verification step 226.

A second EUSD database includes "processed" EUSDs, i.e. EUSDs that have previously been utilized. The second EUSD database may be accessed in a printed barcode database access step 230, and a determination may be made whether the barcode 32 has previously been printed by the validation station 14 in a barcode print query step 228. If the barcode 32 has not previously been printed, RFID data and the EUSD data are sent to the RFID printer 18 in a data generation step 232.

A third database that includes a listing of available serial numbers may be accessed in a serial number data base access step 234. The RFID printer 18 then prints an RFID transponder 34 in an RFID transponder printing step 236. An operator may be prompted to apply the RFID transponder 34 to a substrate for scanning with the RFID transceiver 44 in an RFID transponder prompt step 238. The RFID transponder 34 may be applied to a substrate and scanned in an RFID transponder scanning step 240. A determination may then be made whether the RFID transponder 34 correlates to what was sent to the RFID printer 18 in a validation query step 242. If there is a correlation, the operator may be alerted of this fact in a validation alert step 244. The "processed" EUSD database may be updated in a processed EUSD database update step 246, and the serial number database may be updated in a serial number database update step 248. The operator may then be prompted to scan in an EUSD in a scanning prompt step 250, and the process may be repeated.

Figure 4:
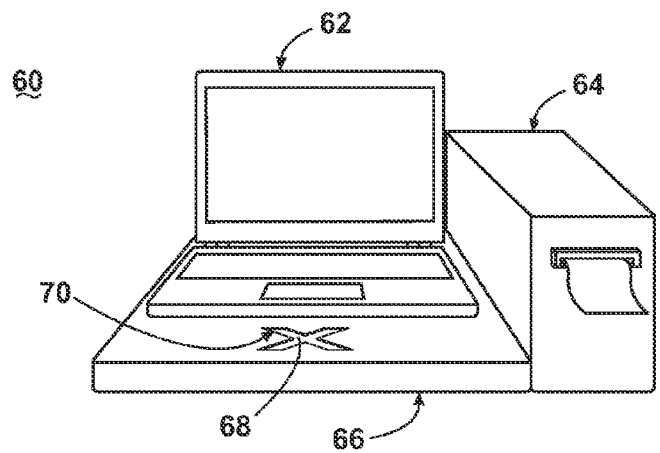
FIG. 4 is a perspective view of a second embodiment of a workstation for preparing and validating a combination barcode and RFID transponder.

FIGS. 4-8 illustrate exemplary embodiments of the encoding/validation workstation described above. FIG. 4 illustrates a self-contained workstation 60 including a laptop computer 62 and a barcode/RFID printer 64. The printer 64 may be a general use printer, such as a known color printer, running software written for printing barcodes and/or RFID transponders. The computer 62 may be supported upon a platform 66 configured to incorporate an RFID antenna 68 for encoding and reading an RFID transponder, and an encoding/validation area 70, which may also include a barcode reader. The process of selecting a barcode, encoding an RFID transponder, and validating the barcode and RFID transponder may be generally as described above. All components required to prepare and validate barcodes and RFID transponders are assembled into a closely-spaced grouping for use by a single operator.

Figure 5:
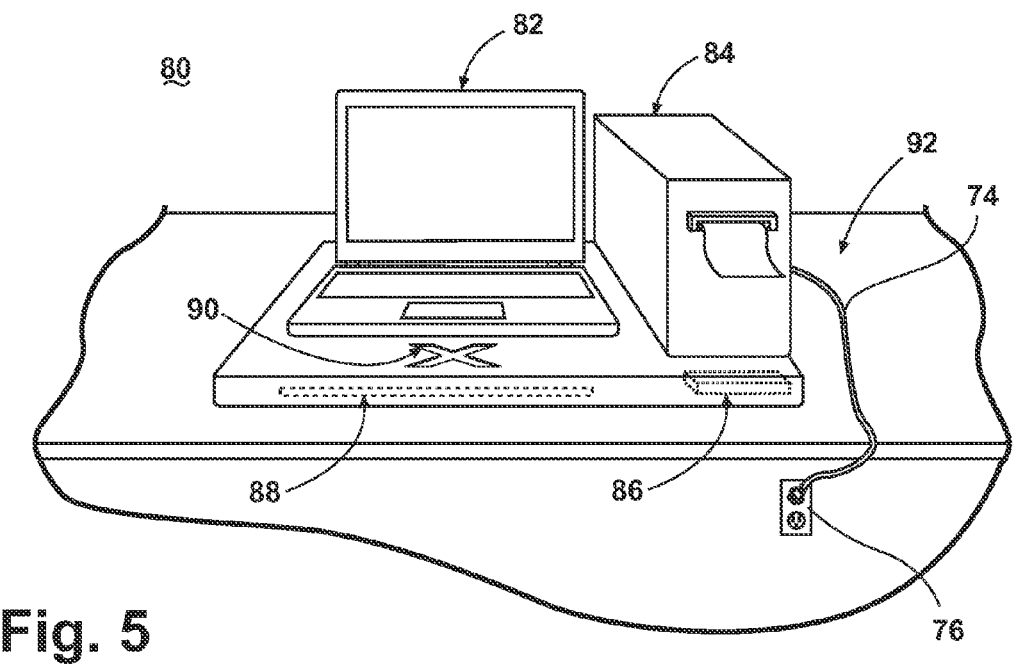
FIG. 5 is a perspective view of a third embodiment of a workstation for preparing and validating a combination barcode and RFID transponder.

FIG. 5 illustrates a variation of the self-contained workstation 60. A small footprint workstation 80 includes a laptop computer 82, a barcode/RFID printer 84, an RFID reader 86, and an encoding/validation area 90 with an RFID antenna 88. As with the self-contained workstation 60, the printer 84 may be a known color printer running software written for producing barcodes, color bars, and/or RFID transponders.

The small footprint workstation 80 may be utilized on a work surface 92 as a generally permanent fixture, powered from a wall outlet 76 through a power cord 74. The process of selecting a barcode, encoding an RFID transponder, and validating the barcode and RFID transponder may be generally as described above. The compact configuration of the workstation 80 enables its use in a confined area, such as a health care lab or other location with limited space, and enables barcodes and RFID transponders to be prepared and validated quickly and accurately.

Figure 6:
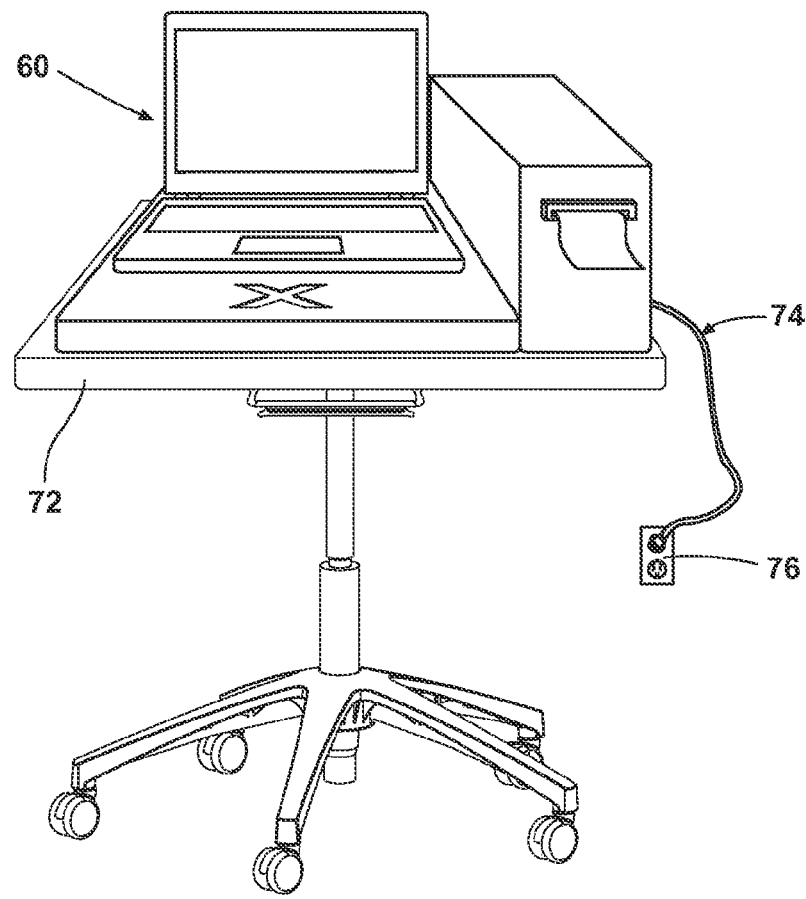
FIG. 6 is a perspective view of a fourth embodiment of a workstation for preparing and validating a combination barcode and RFID transponder.

Referring to FIG. 6, the self-contained workstation 60 may be utilized with a wheeled table 72. The table may include a power distribution device, such as a power strip (not shown), which may be powered from a wall outlet 76 through a power cord 74 to provide power to the workstation 60. The table 72 may be readily disconnected from the wall outlet 76, moved to a selected work area, and reconnected to a different wall outlet, where the workstation 60 may be utilized.

Figure 7:
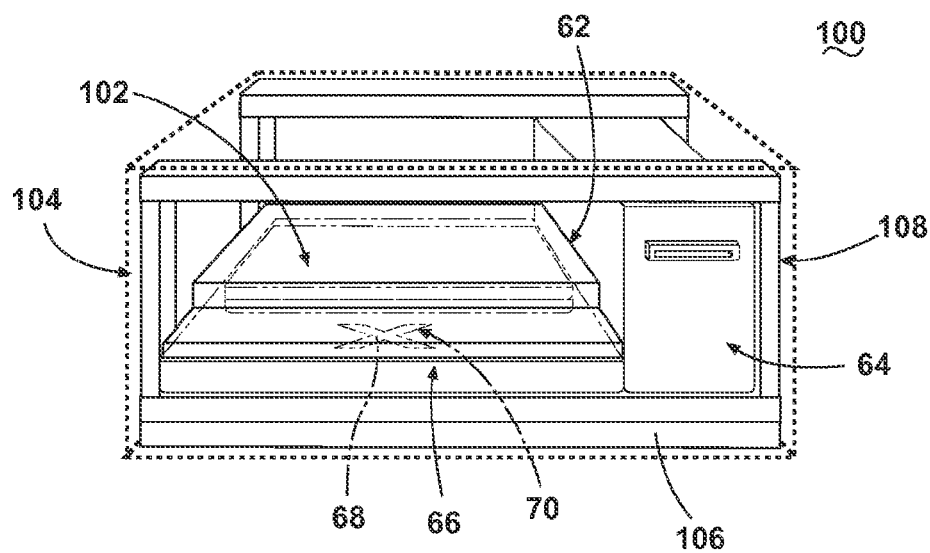
FIG. 7 is a perspective view of a fifth embodiment of a workstation for preparing and validating a combination barcode and RFID transponder.

FIG. 7 illustrates a transportable system 100 including a transportable workstation 102 and a shipping case 104. The transportable workstation 102 may incorporate the self-contained workstation 60, including the laptop computer 62, the barcode/RFID printer 64, the supporting platform 66, the RFID antenna 68, and the encoding/validation area 70. The shipping case 104 may include a case bottom portion 106 for supporting and partially enclosing the workstation 102, and a complementary case top portion 108 which may be secured to the bottom portion 106 through locks, latches, threaded fasteners, and the like. The shipping case 104 may be configured to hold a battery (not shown) for use when no other power source is available, or with a power cord, such as the power cord 74, when external power is available.

The transportable system 100 may be readily assembled and sent to a selected location for temporary use, and returned after use has been completed. This enables composite barcode/RFID transponders to be prepared and validated at any location utilizing a compact, all-inclusive, easily transportable workstation.

Figure 8:
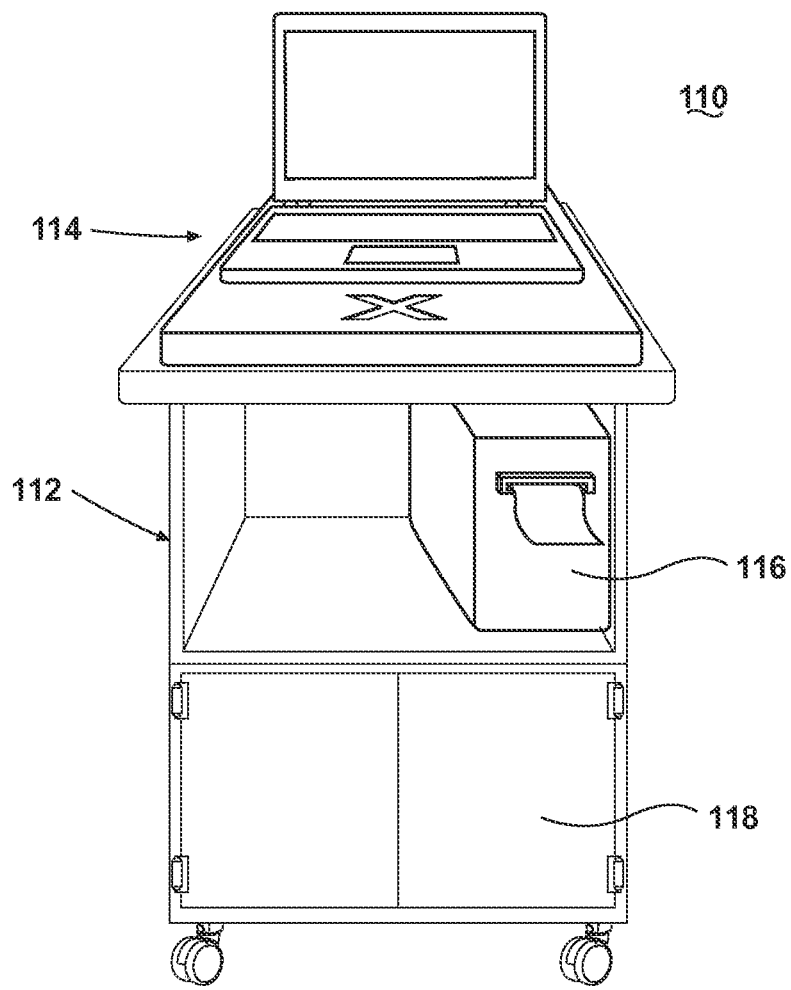
FIG. 8 is a perspective view of a sixth embodiment of a workstation for preparing and validating a combination barcode and RFID transponder.

FIG. 8 illustrates a mobile cart system 110 comprising a wheeled cart 112 supporting a modified small footprint workstation 114 and a barcode/RFID printer 116. The cart 112 may support a battery array (not shown) stored in an appropriate battery compartment 118 for powering the workstation 114 and printer 116. The battery array may also be configured to couple with an external power source, such as a wall outlet (not shown) and suitable devices to bypass the battery array when the external power source may be utilized.

Figure 9:
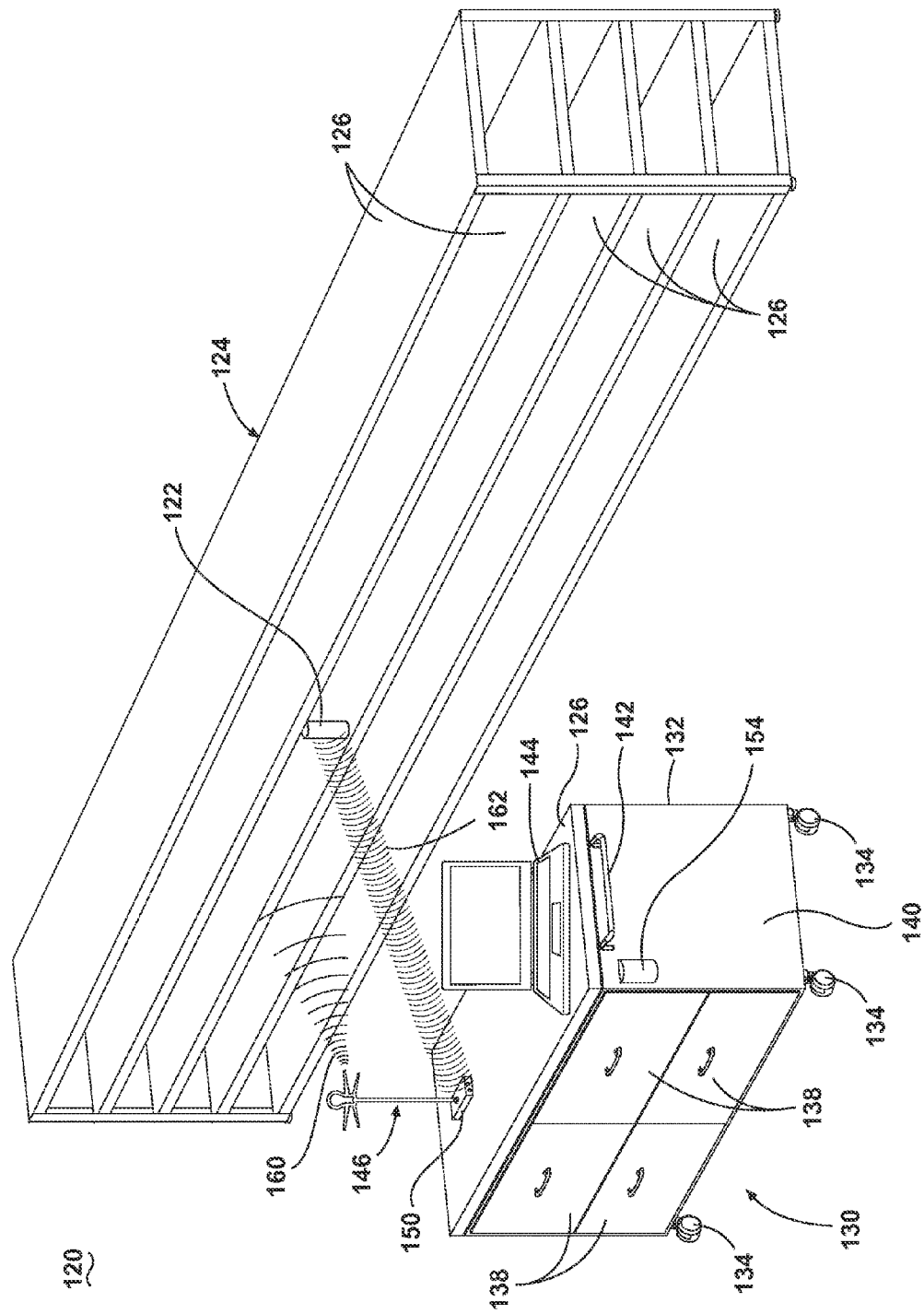
FIG. 9 is a perspective view of an exemplary system/assemblage including a seventh embodiment of a workstation for preparing and validating a combination barcode and RFID transponder to be utilized with an exemplary analytic container stored on a multiple container storage device.

FIG. 9 illustrates an exemplary embodiment of a mobile encoding/validating/auditing system 120, including a mobile workstation 130, for tagging, recording, storing, identifying, and retrieving analytics containers 122 and their contents stored in a multiple container storage device 124. The multiple container storage device 124 is illustrated as a generally known shelving unit having a plurality of storage platforms 126, or shelves. Alternatively, the multiple container storage device 124 may be otherwise configured. For example, the storage device 124 may be a cabinet, a room, a cryogenic container, an automated testing apparatus, an incubator, and the like, and the term "storage device" should be understood as descriptive and not limiting.

The mobile workstation 130 may include a cabinet 132 supported on casters 134, configured with one or more cabinet walls, an upper working platform 136, storage drawers 138, cabinet doors (not shown), open shelving, and the like, compatible with the purposes for which the workstation 130 may be utilized. A first end wall 140 may include a cart grip 142 to facilitate moving the workstation 130. The first end wall 140 may also include a pocket 154 for holding a portable RFID transceiver and/or barcode reader (not shown). Alternatively, the workstation may comprise an open frame on casters, with only platforms or shelves.

The workstation 130 may include a digital control device 144 electrically coupled with a signal broadcaster/receiver 146, or antenna. The digital control device 144 may comprise a laptop or other computer configured for processing and storing tag data received from one or more selected analytics containers 122, and preparing and transmitting selected data to one or more selected analytics containers 122.

The antenna 146 may include an external device mounted to the upper working platform 136, or may be incorporated into the mobile workstation 130 or the digital control device 144. Examples of other configurations may include separate antennas for receiving and transmitting signals, wireless or hardwired coupling of the antenna 146 with the digital control device 144, and the like. Alternatively, a handheld device (not shown) may be utilized for barcode reading, RFID communication, and/or temporary storage of data. The data may be downloaded for further processing and storage to the digital control device 144, a network server, or a central processing apparatus, which may be electronically coupled with the digital control device 144 and/or the handheld device.

FIGS. 10A-C illustrate exemplary embodiments of analytics containers 170. Each analytics container 170 is illustrated as including a container body 172, for receipt of a substance of interest, which may be closable by a container cap 174. The container body and container cap may be removably or fixedly coupled together in any suitable manner, such as threaded, interference or friction fit, welded, hinged, and the like. The term "container" should be broadly construed, and includes closable plastic bags with or without zipper-type closures, cardboard packaging, sealed resin packaging, and the like, of any size or configuration, in which an RFID inlay may be incorporated. Thus, FIG. 10A illustrates an analytics container 170 including an RFID inlay 176 including a microprocessor 178 and an antenna 180, and a barcode (not shown), attached to a sidewall 184 of the analytics container 170. The RFID inlay 176 may be prepared and validated generally as described above, and attached to the side wall 184 of the analytics container 170 either prior to or after validation. Alternatively, the RFID inlay 176 may be incorporated into the sidewall 184 during manufacture of the container body 172, with the container and the label configured so that the barcode remains visible.

As illustrated in FIG. 10B, the RFID inlay 176 may be incorporated into the container cap 174, in a manner similar to the incorporation of the RFID inlay 176 into the sidewall 184. The RFID inlay 176 may be incorporated into components of the cap 174, such as a cap backing disc or "wad," a metallic seal, a polymeric seal, and the like. In this installation, the RFID inlay 176 may be separated into an RFID portion and a barcode portion. The RFID portion may be incorporated into the cap 174, and the barcode portion may be attached to the exterior of either the cap 174 or the container body 172. As illustrated in FIG. 10C, the RFID inlay 176 may be incorporated into the analytics container 170 with the RFID portion in the bottom wall of the analytics container 170 and the barcode portion attached to the exterior.

Figure 11:
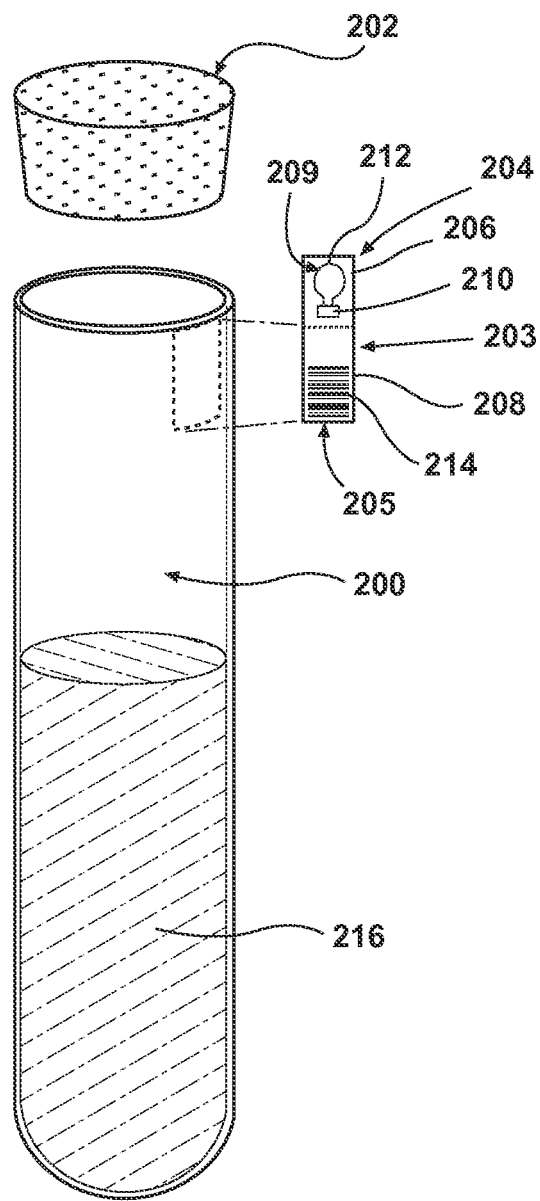
FIG. 11 is a partially exploded view of an exemplary analytic container including a test tube, a stopper, and a chain-of-custody label.

The RFID inlay may be configured for other containers, such as the wall of a sealable plastic bag, an area of a cardboard carton, a portion of resin-based packaging, an area conventionally including a barcode, and the like. FIG. 11 illustrates an RFID inlay or chain-of-custody label 203, including an RFID portion 204 and a barcode portion 205, for use with an analytics container 200, illustrated as a generally known test tube 201 holding a sample 216, and sealable with a stopper 202. The chain-of-custody label 203 may be divided into an extension flap 206 and attachment flap 208. The extension flap 206 may include a microprocessor 210 and an antenna 212 defining an RFID transponder 209, and the attachment flap 208 may include a barcode 214.

The barcode 214 may be imprinted on what may be the outwardly facing surface of the attachment flap 208 to enable the barcode 205 to be read. The attachment flap 208 may include an adhesive (not shown) on what may be an inwardly facing surface for attaching the chain-of-custody label 203 to a wall of the test tube 201. If a barcode may not be utilized, the adhesive may be applied to the outwardly facing surface of the attachment flap 208 to enable the chain-of-custody label 203 to be attached to the inside of the test tube wall, thereby discouraging inadvertent or unintended separation of the label 203 from the test tube 201.

The extension flap 206 may be configured to extend above the test tube opening to enable an increased read rate and decreased interference with the RFID signal due to electromagnetic characteristics of the container or sample contained therein, or other nearby RFID inlays. The chain-of-custody label 203 may be configured so that both the RFID transponder 209 and barcode 214 extend above the test tube opening, and the attachment flap 208 extends beyond the RFID portion 204 and barcode portion 205.

Alternatively, the chain-of-custody label 203 may be perforated between the extension flap 206 and the attachment flap 208. An adhesive may be applied to both the extension flap 206 and the attachment flap 208 to attach the label 203 to both the outside of the test tube wall and the stopper 202. Removal of the stopper 202 may then result in separation of the extension flap 206 from the attachment flap 208 to indicate that disturbance of the sample 216 may have occurred. The chain-of-custody label 203 may be oriented in reverse of what is illustrated in FIG. 11 so that the RFID transponder 209 may remain with the test tube 201.

The RFID transponder 209 and barcode 214 may be prepared and validated generally as described above. The microprocessor 210 may incorporate sufficient storage capacity to not only store the unique identification data linking the RFID transponder 209 with the barcode 214, but also data that may be input during movement and use of the test tube 201 and its due sample 216.

When an analytics container 200 first receives the sample 216, such as a medical/surgical sample, crime scene evidence, or other substance of interest, the sample 216 may be logged into a database with basic identification information, and a barcode 214 may be generated and validated for the sample 216 in a process generally as described above. An RFID transponder 209 may be encoded and incorporated with the barcode 214 into the chain-of-custody label 203. In addition to basic identifying information, such as a EUSD number, the RFID transponder 209 may be encoded with relevant information about the sample, such as organizational relationships (project, patient, criminal case), the identity of the person recovering the sample, evidence, or other substance, the origination date, the origination location, the analytics container contents, the storage location, chain-of-custody information (dates, locations, custodians), a disposal date, the disposer's identity, temperature, humidity, and the like.

Thus, passage of an RFID transceiver within the effective radius of the RFID transponder 209 may enable ready recovery of stored information, facilitate acquisition of the analytics container 200 and its contents, and enable additional information to be stored on the RFID transponder 209. Referring to FIGS. 9 and 11, the RFID transponder may be actuated by the transmission of a signal 160 from a signal broadcaster antenna 146 to the RFID inlay 203. The RFID inlay 203 may respond by transmitting a signal 162 containing selected information through an RFID receiver antenna 150 back to the mobile RFID workstation 130. An alternate configuration of the workstation 130 may include a single transceiver or antenna (not shown) that may both transmit and receive the signals 160, 162.

In selected circumstances, the mobile RFID workstation 130 may transmit a signal 160 to the RFID inlay 203 containing selected data for storage on the RFID inlay 203. Alternatively, data of significance to a plurality of analytics containers 200 may be broadcast for storage on the RFID inlay 209 of each container 200 simply by moving an RFID transceiver, including a handheld transceiver or the mobile RFID workstation 130, within the effective broadcast radii of the RFID inlays of interest, and transmitting such data to the selected containers 200. As well, data may be recovered from individual RFID inlays of interest by moving an RFID transceiver within the effective broadcast radii of the RFID inlays.

Figure 12:
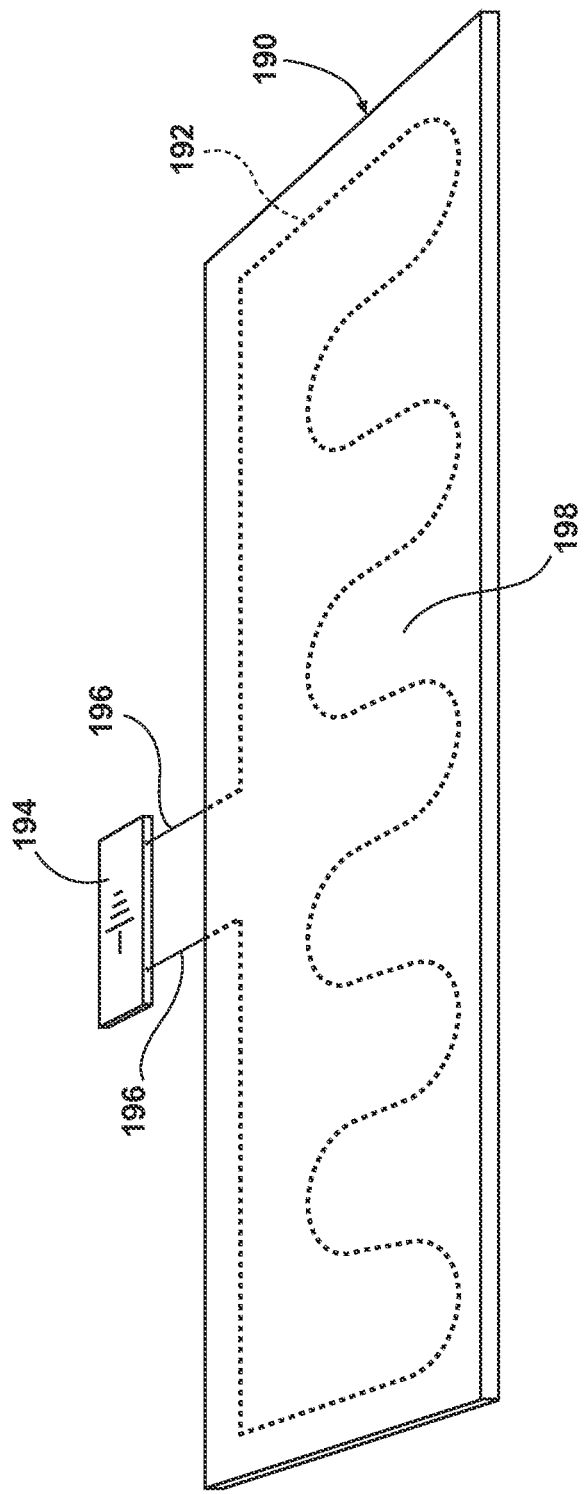
FIG. 12 is a perspective view of an exemplary embodiment of an RFID antenna platform for use with the multiple container storage device of FIG. 9.

FIG. 12 illustrates an alternate means of communication with one or more analytics containers 200. An RFID antenna platform 190 may replace shelving, such as the shelving 126 illustrated in FIG. 9. The antenna platform 190 may comprise a plate-like platform body 188 incorporating a platform antenna 192. The platform antenna 192 may be electronically coupled wirelessly or through suitable electrical leads 196 with a transceiver 194. The transceiver 194 may be attached to the multiple container storage device 124, or incorporated into the platform body 188. The transceiver 194 may be configured for communication with a mobile signal transceiver, such as the mobile RFID workstation 130, or a handheld RFID transceiver (not shown).

The transceiver 194 may be configured also for communication with individual chain-of-custody containers 122. The platform antenna 192 may continuously monitor the containers 122 stored on the platform 190, and communicate data recovered from the containers 122 to the mobile RFID workstation 130 or handheld transceiver within a preselected area, either automatically or on demand. The platform antenna 192 may have a suitable configuration, such as sinuous as illustrated in FIG. 12, a grid, and the like. If the digital control device 144 has wireless capability, data may be transmitted directly from the transceiver 194 to the control device 144.

If an analytics container 200 may be moved to a different location, the container 200 may be transported in the workstation 130. Communication between the digital control device 144 and the analytics container 200 may continue during transportation to a different location. In an alternate example, a dedicated transceiver (not shown) may be associated with a drawer 138 to continuously monitor transported analytics containers 200. Information from the analytics container 200 may be transmitted to the digital control device 144. With suitable hardware, an operator may input data, such as the date of removal from the storage device 124, the identity of the custodian, and the delivery location, into the digital control device 144 and the analytics container 200. Upon delivery, the receiving custodian may input the date of receipt, the custodian identification, the storage location, and the like, onto the RFID inlay 209.

In yet another alternative, the workstation 130 may continuously transmit a signal as the workstation 130 is moved along the storage device 124. The signal may be modulated to actuate all RFID inlays simultaneously. Response signals from each RFID inlay may be received, processed, separated, and organized in the digital control device 144.

Each ID element must be validated, both individually and as a combination, prior to use. Preparation of the barcode and RFID transponder, and subsequent validation QC, is an aspect of RF technology in combination with symbology that may pose difficulties.

RFID transponders and barcodes are fabricated, typically by printing an RFID transponder and a barcode on a selected substrate. The conventional process is to print the barcode and encode the RFID transponder using a "specialized" RFID printer. There are several disadvantages in this approach, including limitations on quality and type of printing, miscoding, slow printing, a limited ability to validate printed symbologies and encoded RFID transponders, and limitations on post-process functions, such as "locking" of the RFID inlay. Furthermore, mistakenly tagging a properly printed and encoded label on the wrong product may occur, particularly if the label may be attached to the product at a location remote from the printing/encoding area.

It may be necessary to procure and maintain different printers/embossers for the RFID transponders and symbologies. Furthermore, both RFID transponders and the symbologies must be encoded with data unique to the item with which the RFID and symbology may be associated. Encoding may also require separate encoding devices for both tags. The use of separate encoding devices presents a risk that the encoding may be improperly implemented, leading to a lack of correlation between the RFID data and the UPC data. If validation of the encoding may be included, yet another device must be employed that is capable of reading and comparing the RFID data and the UPC data. Such devices and process steps may increase costs significantly.

Circumstances may arise that necessitate tracking or controlling items of interest that may be numerous, identical in appearance, and collected in a single location. For example, hospital treatment centers, such as surgical suites, fixed and mobile sample recovery stations, and the like, may generate a large number and variety of samples from patients that must be further processed or tested. Obtaining and processing the sample may frequently result in the sample being transported to and stored at one or more diverse locations. Current means of tracking such items often require a substantial amount of handling, inspection of the item, and, in the case of tracking systems utilizing barcodes or similar identifiers, accessing the item to enable reading of the barcode. This may be laborious, increasing costs, and increasing the potential for sample loss or sample misidentification.

Circumstances may also arise in which an item of interest may be obtained and containerized, and must be stored for a substantial period of time before and after it may be utilized. For example, crime scene evidence may be obtained, and secured in a criminal evidence storage room, where it may await further analysis and use in the prosecution of a criminal defendant. Pre-trial analysis of the evidence may involve transportation and temporary holding at a laboratory or similar location. Maintaining a complete chain of custody, sufficient to satisfy criminal procedure requirements, and capable of fully supporting testimony concerning the item and its relevance, may be critically important.

Evidentiary chain of custody may often be supported by documentation that is prepared by one or more custodians of the evidence, and remains with the evidence at all times. This documentation may include specific verifiable information concerning the whereabouts of the evidence continuously from recovery to trial. This documentation must be accurately prepared, and must account for the entire time during which the evidence is in government custody. This may be laborious and costly, with a significant potential for evidence loss or misidentification.

Similar circumstances may arise in which a plurality of items must be periodically accounted for. An example is monitoring and evaluating of inventory at a manufacturing or retail facility. This typically involves physically selecting and recording each item by one or more personnel. Information concerning, for example, the identity of the items, categorization of the items, the number of items in a category, the cost of each item, and the like, may be recorded by preparing documentation, or in an electronic device, such as a laptop computer. Bar code readers may be utilized to record information about bar-coded items, which may then be downloaded to a digital device for further processing. However, barcodes and barcode readers require that each item be accessed to enable the barcode to be read. This, too, may be laborious and costly, and there may be the potential for overlooking items or recording information incorrectly.

The encoding/validation system described herein is user-friendly, and may facilitate accurate encoding/programming and total quality control (QC) validation of the barcode and RFID elements. The system may leverage known barcode technology, such as standard, readily-available printers, to facilitate the encoding of an RFID transponder, and/or associate a barcode with a pre-encoded RFID transponder, thereby enabling both forms of Auto-ID to function together and provide a dual, redundant Auto-ID functionality. The system may also enable QC validation of the barcode and RFID transponder in one of two ways: 1) prior to the attachment of the off the product to be tagged testing the tag or label, or 2) on the product (tagged).

Figure 13:
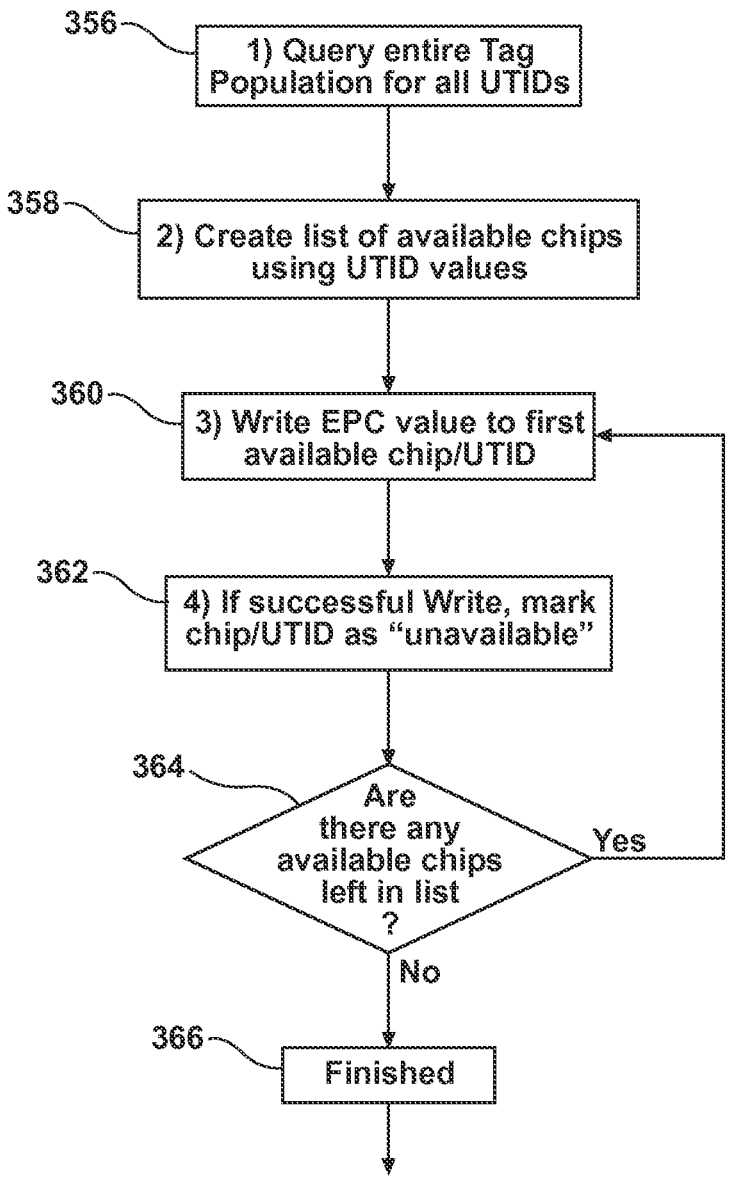
FIG. 13 is an exemplary flowchart of a high-speed method of identifying and encoding a plurality of RFID inlays.
Figure 14:
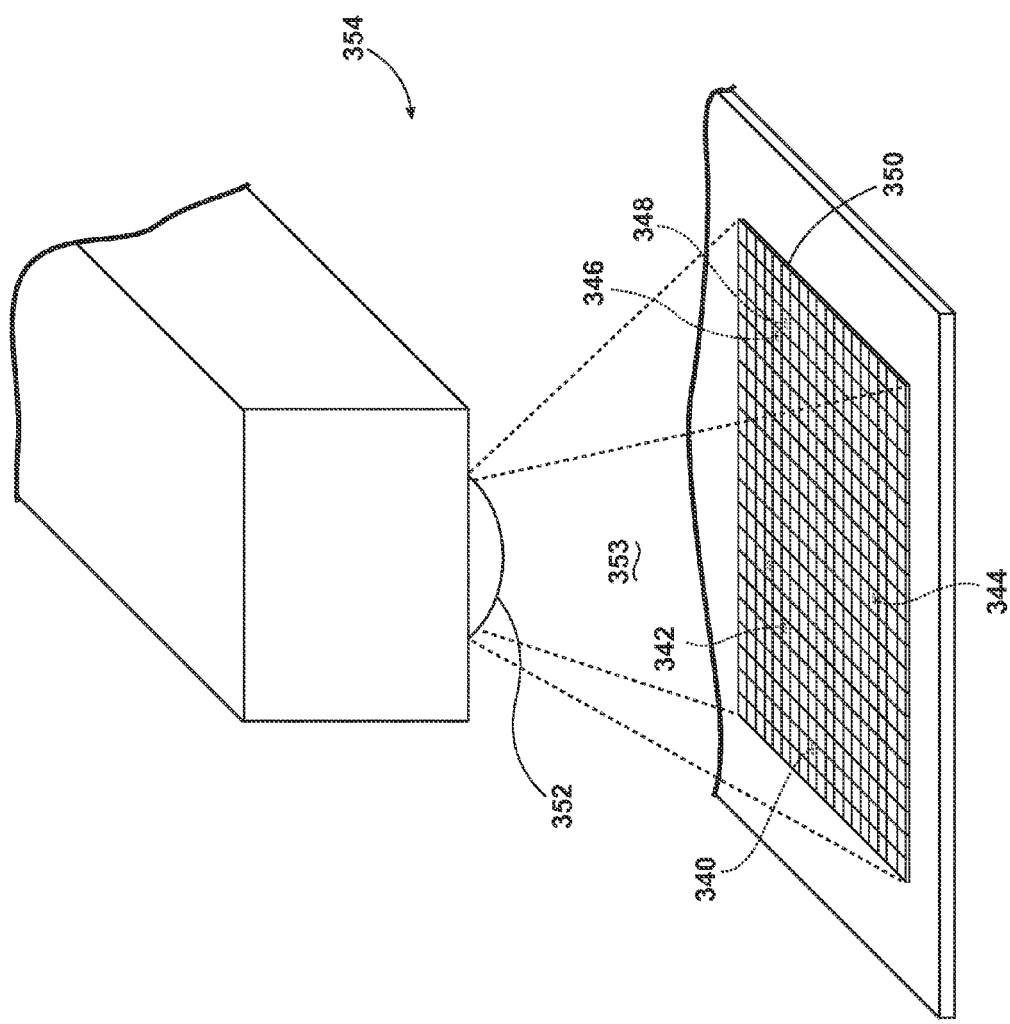
FIG. 14 is a perspective partial view of an exemplary apparatus for high-speed identification and encoding of a plurality of RFID inlays.
Figure 15:
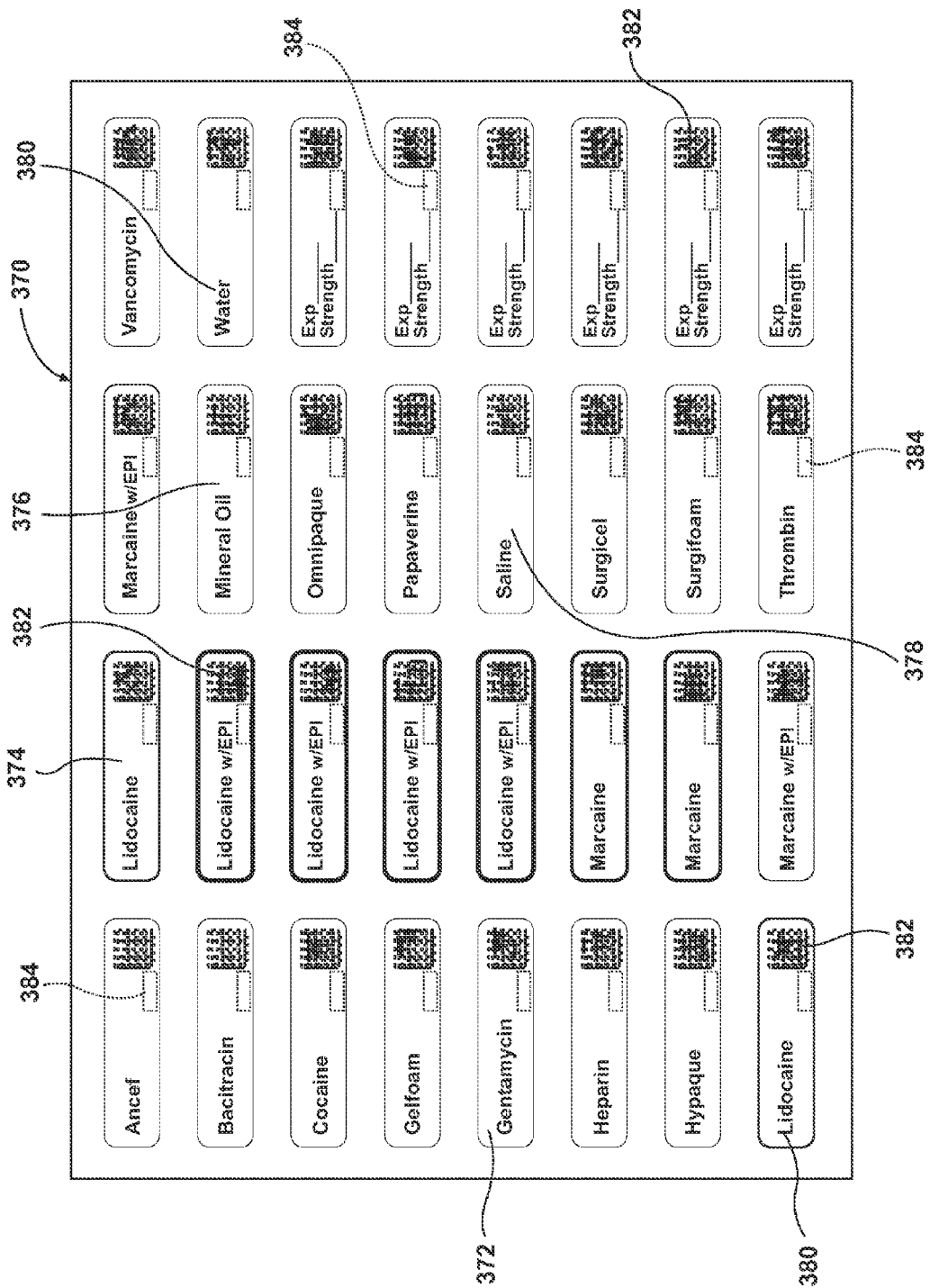
FIG. 15 is a plan view of an exemplary array of labels incorporating symbologies and RFID transponders capable of high-speed identification and encoding.
Figure 16A:
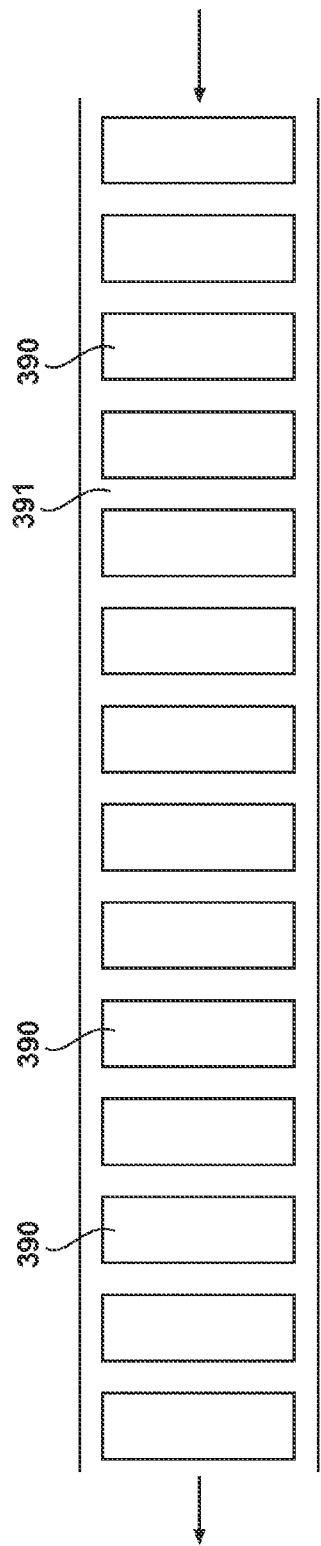
FIGS. 16A-B are schematic views, respectively, of an embodiment of a linear array of RFID inlays, and a linear array of interrogator antennas operating at different frequencies to enable simultaneous reading and encoding of RFID inlays according to the invention.
Figure 16B:
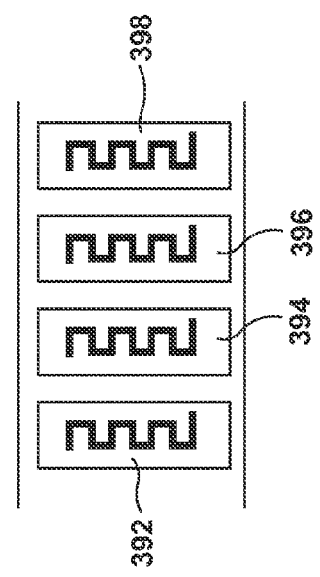

In another embodiment, illustrated in FIGS. 13-15, an exemplary method and apparatus are illustrated for identifying and encoding a plurality of RFID inlays simultaneously without erroneously identifying and encoding adjacent inlays. For example, FIG. 14 illustrates selected RFID inlays 340, 342, 344, 346, 348 in a plurality of inlays removably arranged in a matrix configuration on a carrier substrate 350 and positioned in an identification and encoding station 354.

A transmitter 352 may be included in the station 354 for communication with each inlay. Alternatively, a plurality of transmitters, e.g. a row or matrix, correlating spatially with a plurality of RFID inlays, may be included, each configured for communication with one or more pre-selected inlays. Whether a single inlay or a plurality of inlays may be identified and encoded utilizing a single transmitter or a plurality of transmitters, the identification and encoding system is fundamentally based upon a single RFID inlay having a single permanent, unique identity.

The microprocessor, or "chip," in an inlay may be provided with a unique identifier, referred to as a "Unique Tag ID" or "UTID" stored in an on-chip memory bank. The UTID memory bank may contain a factory-programmed, unique serial number that may be permanently write-protected. Each chip in an RFID transmitter's transmission field 353 may be identified by reading each UTID value. For example, a single reader may be utilized to identify and encode a plurality of RFID inlays without the use of RF barriers or very near-field transmitters, so long as the reader's transmission field 353 may encompass a preselected configuration, i.e. a row or a matrix, of RFID inlays.

Chips may also include a memory bank known as an "Electronic Product Code" or "EPC" memory bank. The EPC memory bank may be an on-chip user-programmable memory to which data may be written. An encoding system may transmit a "blind" write command, i.e. a command that may not be directed to a pre-selected RFID inlay, to a programmable memory. If a "blind" write command may be transmitted to only a single inlay within the transmitter's transmission field 353, only that inlay may be encoded. However, if a plurality of inlays within the transmitter's transmission field 353 are to be encoded, a "blind" write command may be transmitted to the plurality of inlays within the transmission field 353. The first inlay to receive and acknowledge the write command may be the inlay encoded, which may not be the intended inlay.

It may thus be desirable to ensure that a write command may be transmitted only to the intended RFID inlay. A write command may be transmitted to a single preselected chip having a UTID memory bank included within a plurality of chips having UTID memory banks without the need for tag isolation, such as physical shielding. This may be accomplished with an RFID transmitter utilizing a special write command incorporating the UTID value for the preselected chip. This effectively specifies the chip (UTID) to which transmitted data should be written.

The exemplary flowchart of FIG. 13 illustrates a method of identifying and encoding a plurality of RFID inlays. With the plurality of inlays positioned within the transmitter's transmission field 353, the transmitter 352 may transmit a request 356 to the plurality of inlays for each inlay's UTID. The station 354 may then create a listing 358 of the UTIDs, and thus a listing of available chips, based upon responses to the request 356. Each chip represented on the UTID listing may be sequentially encoded 360 with an EPC value. The chip may then transmit 362 a "successful write" or "successful completion" message, which may trigger an update to the UTID listing that will prevent further EPC encoding of the chip. The station may then poll 364 the UTID listing to ascertain whether any chips remain to be EPC encoded. If no other chips remain to be encoded, processing passes to a finalization step 366 to be followed by additional encoding and verification steps, or preparation of the RFID inlays for shipment and use. If at least one other chip remains to be encoded, an unencoded chip may be encoded 360 with an EPC value, and the process may continue as described above.

This process enables a plurality of RFID inlays to be identified and encoded regardless of whether the inlays are in a regular order or not. For example, as illustrated in FIG. 14, the inlay 340 may not be followed in spatial sequence by the inlay 342, the inlay 344, the inlay 346, and the inlay 348, even though their UTIDs may be sequential. Nevertheless, the inlays may be sequentially identified and encoded regardless of their relative positions as long as they are within the transmitter's transmission field 353.

Verification may proceed as previously described herein. For example, a plurality of RFID transponders may be incorporated into a plurality of RFID labels, each having a unique UPC code printed thereon. The UPC code may be correlated with the associated inlay UTID, and both may be correlated with an EPC code written to the RFID chip. In effect, the UTID ensures that communication between the RFID inlay and RFID encoding and validation system may be carefully controlled, and the system ensures accurate encoding and validation of each RFID inlay. The identification and encoding station 354 may be utilized with, or incorporated into, the encoding and validation system 10 to enable encoding and validation of a plurality of RFID inlays, including one or more symbologies, at a relatively high speed, thereby increasing productivity while reducing costs.

FIG. 15 illustrates an exemplary label sheet 370 such as may be used in a surgical operating room to identify pharmaceuticals, medical materials, antiseptics, and the like. The label sheet 370 may include removable labels for identifying items such as Gelfoam 372, lidocaine 374, mineral oil 376, saline preparation 378, and the like. Each label may include selected symbologies, for example, an alpha-numeric character(s) 380, a 2-D code 382, color coding, and the like, and an RFID transponder 384.

Each label may be manufactured with an incorporated RFID transponder 384 having a chip with a UTID. The label may be printed with an alpha-numeric character(s) 380 such as a contents name, a 2-D code 382, color coding, and the like, pertinent information on each being encoded and stored in an on-chip EPC memory. The EPC information and UTID may be correlated and verified prior to or during a medical procedure, as previously described herein.

To further increase the throughput of an encoding and reading operation and/or to concurrently encode and read multiple RFID tags or transponders, multiple RFID interrogator antennas may be utilized for parallel operations. To eliminate inherent adjacency issues with RFID tags/transponders in close proximity to each other, a specialized array of antennas may be used. Adjacency issues may include reading from and/or encoding an RFID tag/transponder that may be adjacent an interrogator antenna, but may not be the intended target tag/transponder. This may be referred to as "crosstalk."

When RFID tags/transponders are arranged in close proximity to each other, satisfactory encoding and reading operations and minimal "cross-talk" may be facilitated by an antenna array configured with spacing and/or separation complementary with the spacing and/or separation of the RFID tags/transponders. To eliminate "cross-talk," each antenna in the array may be meticulously tuned to a narrow frequency band or a single frequency.

FIGS. 16-20 illustrate exemplary embodiments of an array of multiple antennas configured for sequential and/or parallel RFID encoding and reading. FIG. 16A illustrates schematically an exemplary linear array of RFID tags 390 in regular disposition on a substrate 391, such as a ribbon or web that may be stored on a reel. FIG. 16B illustrates an exemplary array 399 of interrogator antennas 392, 394, 396, 398 arranged in close proximity one to another, complementary to the separation of the RFID tag array 390. Each antenna may be configured with a different operating frequency. For example, the interrogator antenna 392 may have an operating frequency of 910 MHz, the interrogator antenna 394 may have an operating frequency of 921 MHz, the interrogator antenna 396 may have an operating frequency of 902 MHz, and the interrogator antenna 398 may have an operating frequency of 917 MHz.

Similarly, the RFID tags 390 may be configured to be responsive and/or transmit at selected frequencies. For example, some of the tags may have an operating frequency of 910 MHz, some an operating frequency of 921 MHz, others to an operating frequency of 902 MHz, and the remainder an operating frequency of 917 MHz. The antenna array 399 may be positioned relative to the RFID tags 390 so that the linear array of RFID tags 390 may move (indicated by the arrows as proceeding to the left) in an indexed or continuous manner above or below the antenna array 399, thereby enabling 4 tags to be concurrently read and/or encoded.

Figure 17A:
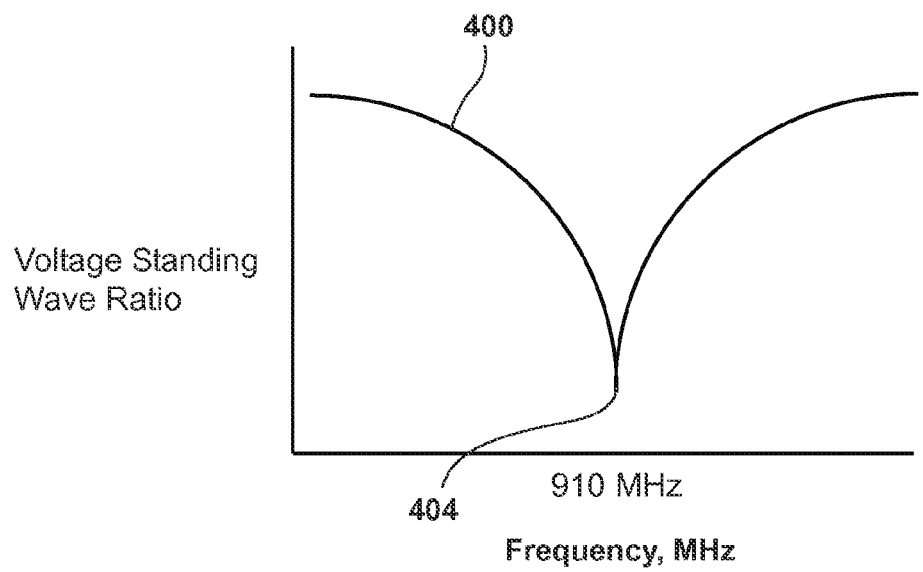
FIGS. 17A-B are schematic views, respectively, of a signal-to-noise ratio v. frequency curve for a first antenna having a first operating frequency, and a signal-to-noise ratio v. frequency curve for a second antenna having a second operating frequency different than the first.
Figure 17B:
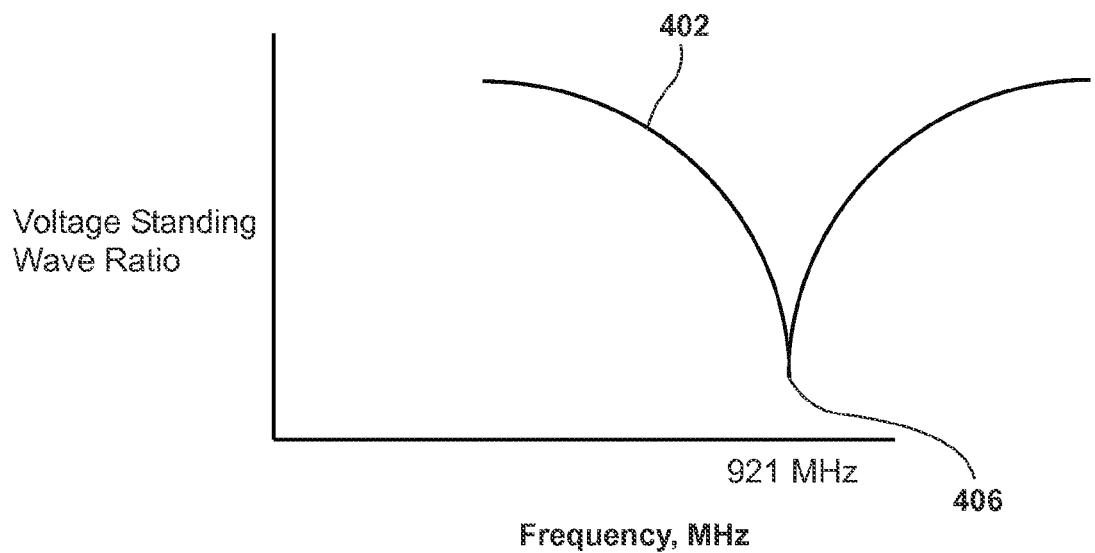

The different operating frequencies of the antennas may enable the reading and encoding to occur without radio frequency interference, i.e. "crosstalk," from one to another. For example, FIGS. 17A and 17B schematically illustrate "voltage standing wave ratio (VSWR) vs. frequency" curves 400, 402 for 2 antennas tuned to have different operating frequencies. VSWR is a measure of reflected power or signal strength; the more reflection, the greater the reduction in signal strength. If an antenna has zero loss of signal strength at a selected frequency, i.e. the antenna is perfectly tuned to that frequency, the VSWR at that selected tuned frequency may be 1.0, which characterizes an ideal, theoretical case.

In actuality, at the selected tuned frequency the antenna may have a VSWR of approximately 1.1-1.2. At other frequency ranges in which the antenna may be blocking, i.e. unresponsive to, the signal, the VSWR may be approximately equal to or greater than 4.0.

As illustrated in FIG. 17A, a first antenna may be configured for a tuned frequency of 910 MHz, which corresponds to a minimum VSWR 404. As illustrated in FIG. 17B, a second antenna may be configured for a tuned frequency of 921 MHz, which corresponds to a minimum VSWR 406. Above and below the tuned frequencies, the VSWR may quickly change. Thus, considering the first antenna as illustrated in FIG. 17A, at a frequency, for example, of 921 MHz, the VSWR may be substantially greater than the minimum that occurs at 910 MHz. In other words, the first antenna, being most responsive at 910 MHz, may be essentially unresponsive to the 921 MHz signal. Unless the signal delivered to the first antenna is at a frequency of 910 MHz, the signal may be "ignored" by the antenna. Further reduction in "crosstalk" may be realized by aligning the antennas and RFID tags with a very small separation distance.

Alternatively, this phenomenon may be expressed in terms of the well-known signal-to-noise ratio (SNR) vs. frequency.

Figure 18:
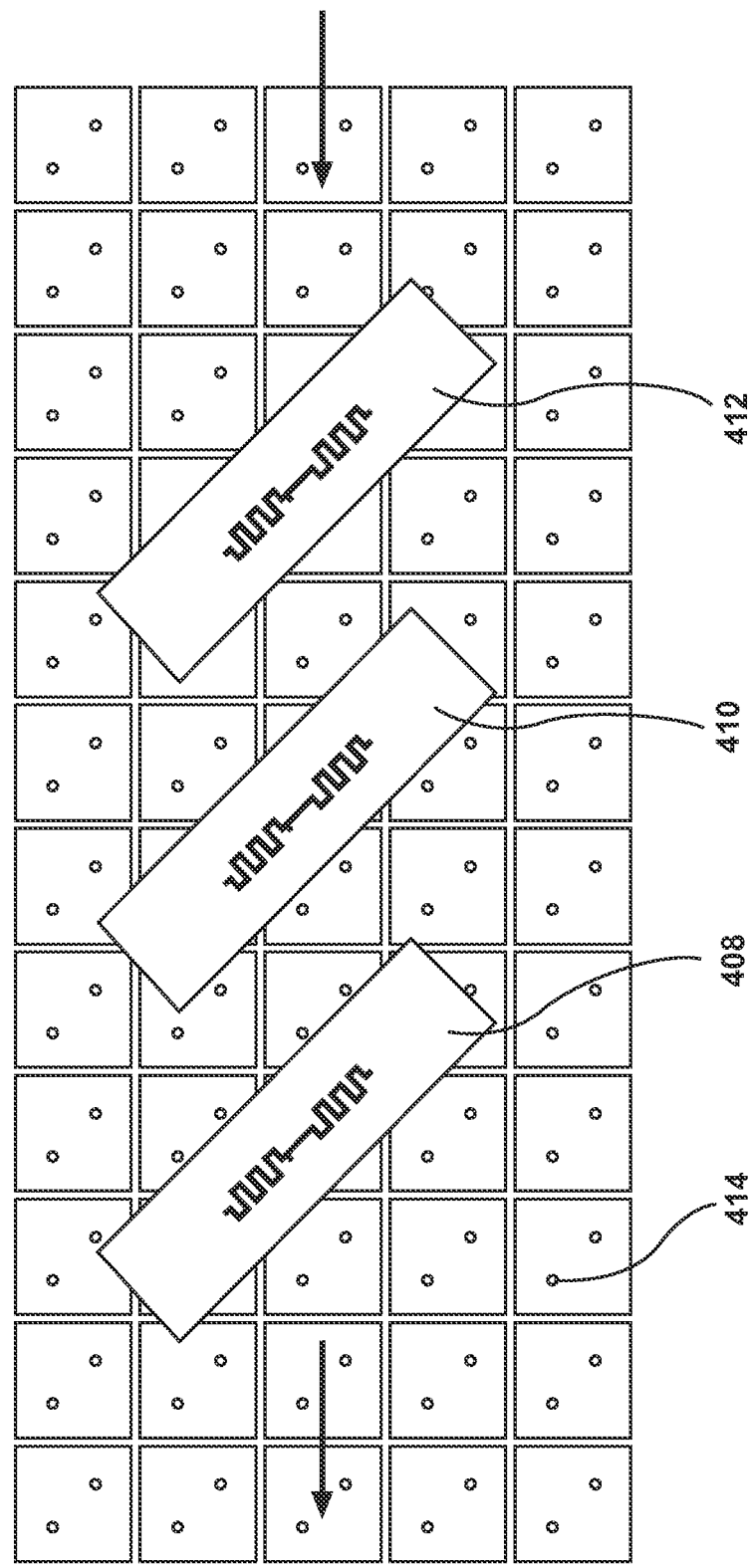
FIG. 18 is a partial plan view of an embodiment of 3 interrogator antennas, each having a different operating frequency, arranged in an array according to the invention.
Figure 19:
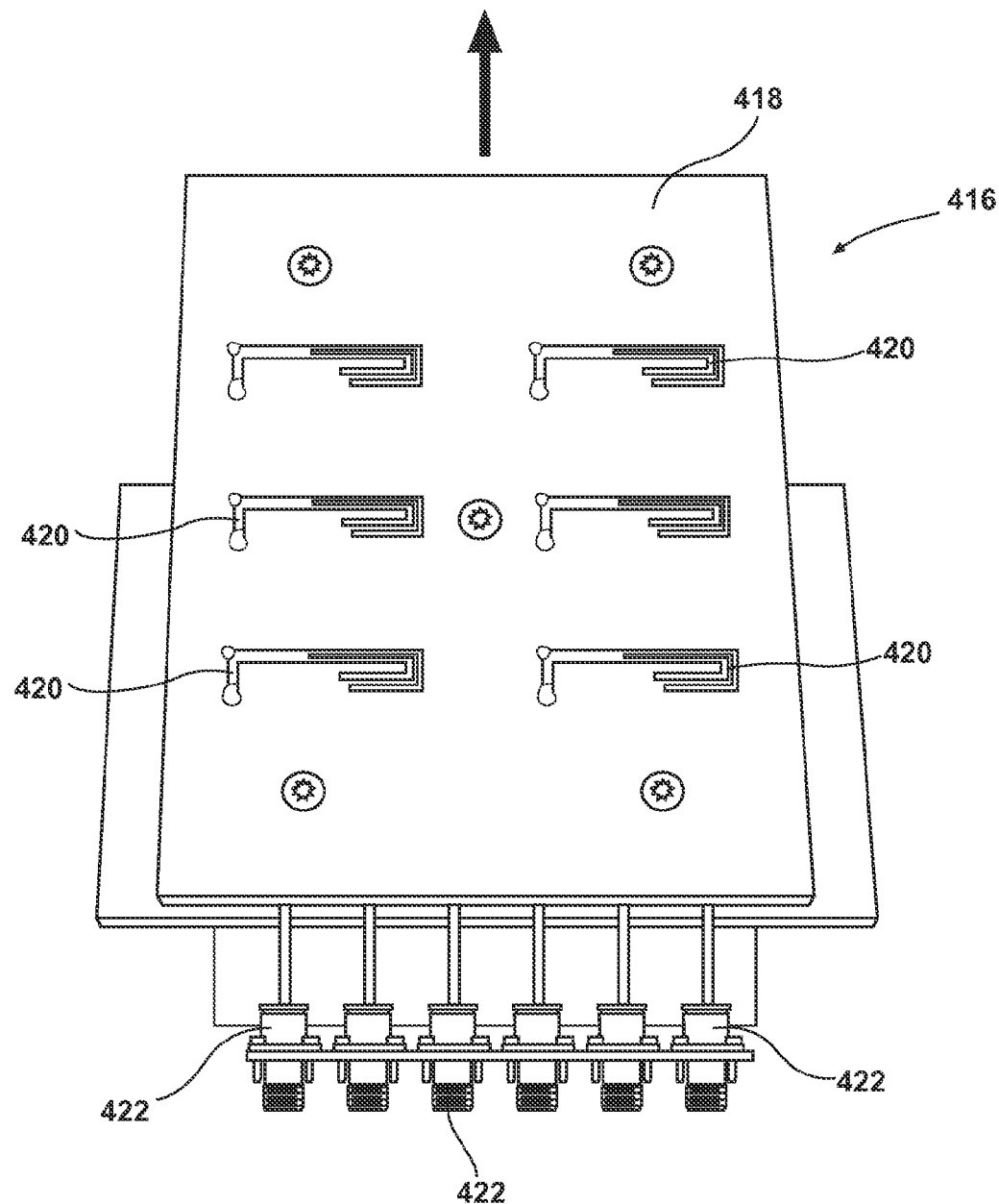
FIG. 19 is a perspective view of an embodiment of 6 interrogator antennas, each having a different operating frequency, arranged in a 2×3 matrix, according to the invention.

Interrogator antennas may be arranged so that no 2 antennas having similar tuning are adjacent each other, as illustrated in FIG. 18. FIG. 18 illustrates 3 exemplary interrogator antennas 408, 410, 412 having, respectively, operating frequencies of 911 MHz, 902 MHz, and 917 MHz. The antennas 408, 410, 412 are illustrated as suspended from a shield 414, i.e. the view is of the underside of the antennas and shield. The RFID tags (not shown) may proceed right-to-left, as shown by the arrows, for reading and encoding.

FIG. 18 illustrates another exemplary embodiment of an interrogator antenna array 416. In this embodiment, a circuit board 418 may include a plurality of interrogator antennas 420 (in FIG. 18 there are 6) incorporated into the circuit board 418. Each antenna may be tuned to a different operating frequency as previously described herein. The antennas 420 may each be provided with a power/signal lead 422 for coupling with a power source and suitable electronics, such as computers, printers, processors, encoders, and the like. In FIG. 18, a double-wide array of RFID tags (not shown) may be concurrently read and/or encoded 6 at a time, and may proceed past the circuit board 418 and interrogator antennas 420 in an upward direction.

Because each interrogator antenna may be tuned to a narrow frequency band or a single frequency, it may receive an optimal signal from an RFID tag/transponder transmitting at a frequency corresponding to the tuned antenna frequency. Tag/transponder signals transmitted at a selected frequency are not received by interrogator antennas having a different tuned frequency, even though the antennas may be adjacent the tags/transponders, therefore minimizing or eliminating "cross-talk."

Figure 20:
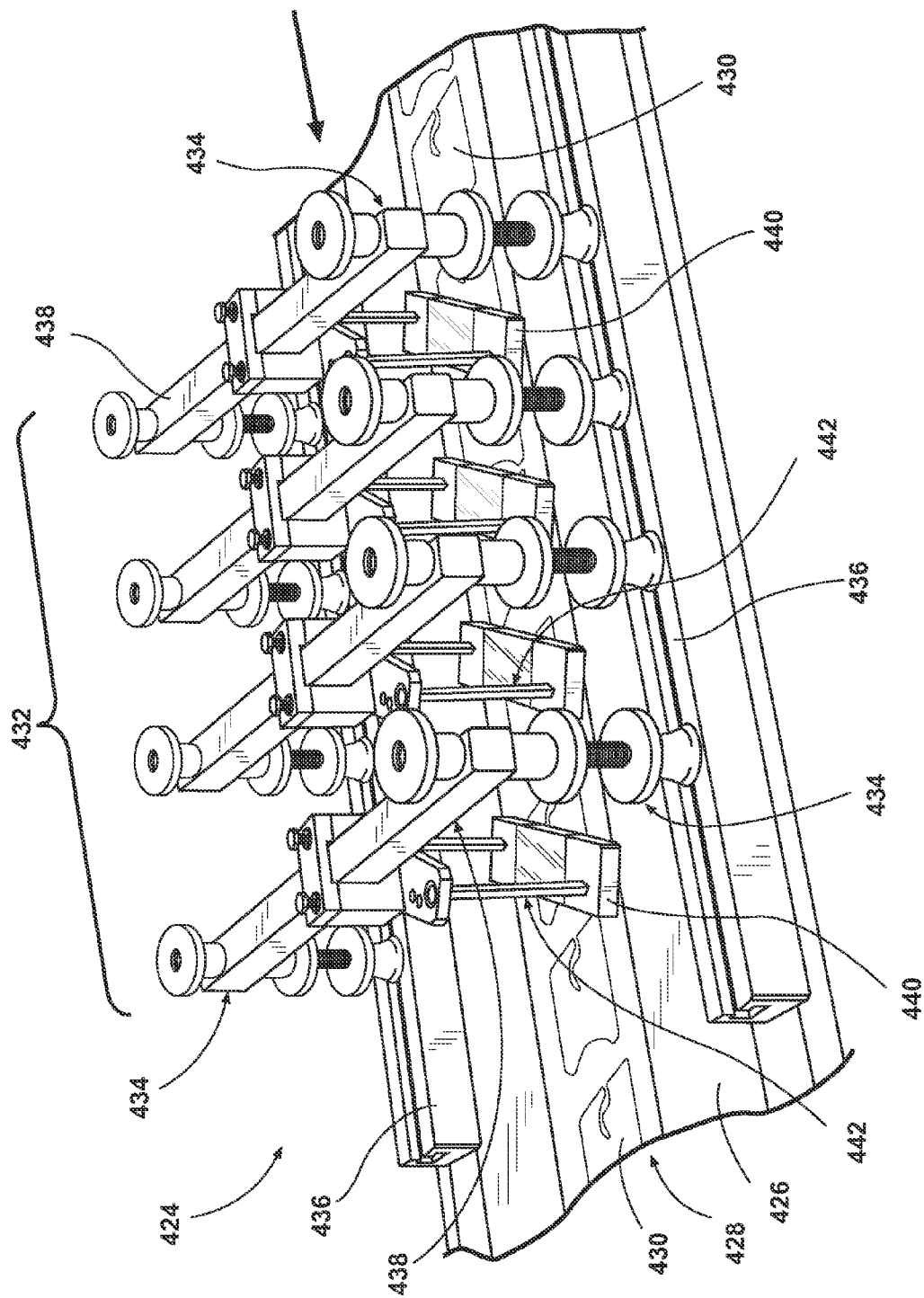
FIG. 20 is a perspective view of an embodiment of an interrogator antenna/inlay delivery system/assemblage for simultaneously reading and/or encoding an array of RFID inlays according to the invention.

FIG. 20 illustrates an exemplary embodiment including an interrogator antenna/inlay delivery system 424. This system 424 may include a conveyor apparatus 426 and an interrogator antenna suspension frame 432. The conveyor apparatus 426 may convey an RFID inlay ribbon 428 having a plurality of regularly spaced RFID inlays 430. FIG. 20 illustrates the ribbon 428 having a single line of inlays 430. However, the system 424 may be configured to accommodate RFID inlay arrays configured, for example, as a matrix of a selected number of columns and rows.

The interrogator antenna suspension frame 432 may include a plurality of adjustment pedestals 434 movably attached to a pair of pedestal rails 436 extending along the conveyor apparatus 426. A pair of adjustment pedestals 434 may support an interrogator antenna beam 438 extending generally horizontally across the conveyor apparatus 426. The adjustment pedestals 434 and pedestal rails 436 may be configured so that the pedestals 434 may be secured to the rails 436 to position the antenna beam 438 at a selected location. The pedestals 434 may also be configured for movement along the rails 436 to adjust the longitudinal spacing of the beams 438 consistent with the spacing of the RFID inlays 430. Threaded connections may be utilized for tightening the pedestals 434 to the rails 436 and beams 438, and loosening the pedestals from the rails and the beams to enable horizontal and vertical adjustment of the interrogator antennas 440.

An antenna suspension sub frame 442 may be suspended from the beam 438 to suspend an interrogator antenna 440 above the RFID inlays 430. The suspension sub frame 442 may also be configured for vertical and horizontal adjustment. The system 424 may accommodate precise vertical and horizontal positioning of the interrogator antennas 440 relative to the RFID inlays 430 to thereby minimize the vertical separation of the antennas 440 from the inlays 430, and optimize the horizontal positioning of the antennas 440 relative to the inlays 430, each of which may minimize "crosstalk" and optimize the intended signal.

A method for encoding and reading an array of RFID tags/transponders is somewhat different than the method hereinbefore described. Paragraphs relating to a single transmitter having multiple tags/transponders in its field of view. Using UTIDs to singulate tags/transponders may be viewed as a "software" method for communicating with one tag/transponder at a time.

The use of specialized antennas or antenna arrays may provide an alternate means to physically isolate the communication between a single transmitter and a single target tag. This may be used because the UTID may not always be available from all chip manufacturers. When inlays are in close proximity to one another, and communication must be effected with multiple sequential tags concurrently, it may be necessary to use one transmitter per inlay. If the inlays are closely spaced, the transmitters may also be closely spaced. Typically, a transmitter is positioned only millimeters above an inlay. Transmitter "A" should only communicate with transponder "A," transmitter "B" with transponder "B," and so on. To prevent transmitter "A" from receiving signals from transponder "B," highly tuned antennas and selected frequencies may be employed.

A transponder may respond back to a reader/transmitter by "backscattering" the transmitted frequency. For example, transponder "A" may communicate back to the transmitter at 910 MHz, and transponder "B" at 925 MHz. With highly tuned antennas and selected operating frequencies, transmitter "A" may only "hear" from transponder "A" but not transponder "B."

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

What is claimed is:

1. A method for preparing an RFID label including an RFID inlay mounted on a substrate and having an RFID microchip coupled with an antenna, the method comprising the following steps:
  a) inducing a plurality of RFID inlays to transmit a plurality of associated unique identifiers;
  b) selecting one of said plurality of unique identifiers that is associated with an RFID inlay that transmitted said selected unique identifier;
  c) sending a unique user-selected data set to said RFID inlay associated with said selected unique identifier;
  d) encoding said unique user-selected data set on said RFID inlay associated with said selected unique identifier;
  e) reading said unique user-selected data set associated with said selected unique identifier;
  f) comparing said encoded unique user-selected data set with said unique user-selected data set sent to said RFID inlay associated with said selected unique identifier;
  g) validating that said encoded unique user-selected data set associated with said selected unique identifier is identical to said unique user-selected data sent to said RFID inlay associated with said selected unique identifier;
  h) listing said selected unique identifier associated with said validated unique user-selected data set on a database of unique identifiers associated with validated unique user-selected data sets;
  i) inducing at least one of a plurality of RFID inlays having associated unique identifiers not on said database of unique identifiers associated with validated unique user-selected data sets to transmit a plurality of associated unique identifiers;
  j) repeating steps b)-i) until all unique identifiers associated with validated unique user-selected data sets are on said database of unique identifiers.

2. A method in accordance with claim 1 wherein said unique identifier is one of a Unique Tag Identifier (UTID), a user-specified identifier, and a selected radio frequency.

3. A method in accordance with claim 1, and further coupling said RFID inlay with a label to form an RFID label.

4. A method in accordance with claim 3, and further providing on said RFID label a unique symbology representing said unique identifier and said validated unique user-selected data set.

5. A method in accordance with claim 4, and further reading said unique identifier and said validated unique user-selected data set from said unique symbology on said RFID label.

6. A method in accordance with claim 5, and further comparing said unique identifier and said validated unique user-selected data set read from said unique symbology with said unique identifier and said validated unique user-selected data set encoded on said selected RFID inlay on said RFID label.

7. A method in accordance with claim 6, and further listing said unique identifier associated with said unique symbology on a database of unique identifiers associated with previously utilized symbologies.

8. A method in accordance with claim 1, and further encoding an RFID tag with a unique identifier.

9. A method in accordance with claim 8, and further inducing an RFID tag to transmit said unique identifier.

10. A method in accordance with claim 9, and further creating a listing of unique identifiers transmitted by RFID tags.

* * * * *

UNITED STATES PATENT AND TRADEMARK OFFICE
CERTIFICATE OF CORRECTION

| | | |
|---|---|---|
| PATENT NO. | : 8,496,166 B2 | Page 1 of 1 |
| APPLICATION NO. | : 13/593399 | |
| DATED | : July 30, 2013 | |
| INVENTOR(S) | : Gary P. Burns et al. | |

It is certified that error appears in the above-identified patent and that said Letters Patent is hereby corrected as shown below:

In the Specification:

Column 17, lines 42-48 read:

A method for encoding and reading an array of RFID tage/transponders is somewhat different than the method hereinbefore described. Paragraphs relating to a single transmitter having multiple tags/transponders in its field of view. Using UTIDs to singulate tags/transponders may be viewed as a "software" method for communicating with one tag/transponder at a time.

It should read:

A method for encoding and reading an array of RFID tags/transponders is somewhat different than the method hereinbefore described relating to a single transmitter having multiple tags/transponders in its field of view. Using UTIDs to singulate tags/transponders may be viewed as a "software" method for communicating with one tag/transponder at a time.

Signed and Sealed this
First Day of October, 2013

Teresa Stanek Rea
*Deputy Director of the United States Patent and Trademark Office*